(12) United States Patent
Dewhurst et al.

(10) Patent No.: US 6,430,609 B1
(45) Date of Patent: Aug. 6, 2002

(54) METHOD FOR ACCESSING COMPLEX SOFTWARE APPLICATIONS THROUGH A CLIENT USER INTERFACE

(75) Inventors: Sebastian Dewhurst, Valrico, FL (US); Matthew Gerring, Farindgon; Ian Robert Hawkins, Oxfordshire, both of (GB)

(73) Assignee: AEA Technology plc (GB)

( * ) Notice: Subject to any disclaimer, the term of this patent is extended or adjusted under 35 U.S.C. 154(b) by 0 days.

(21) Appl. No.: 09/681,349

(22) Filed: Mar. 23, 2001

(51) Int. Cl.[7] .................... G06F 15/177; G06F 15/173
(52) U.S. Cl. .................. 709/220; 709/221; 709/223; 717/121
(58) Field of Search ........................... 709/220, 221, 709/223; 717/121

(56) References Cited

U.S. PATENT DOCUMENTS

| | | | |
|---|---|---|---|
| 5,280,570 A | | 1/1994 | Jordan |
| 5,412,756 A | | 5/1995 | Bauman et al. |
| 5,440,739 A | * | 8/1995 | Beck et al. ................. 709/221 |
| 5,680,528 A | | 10/1997 | Korszun |
| 5,689,708 A | * | 11/1997 | Regnier et al. ............ 709/104 |
| 5,745,879 A | * | 4/1998 | Wyman ........................ 705/1 |
| 5,748,896 A | * | 5/1998 | Daly et al. ................. 709/223 |
| 5,778,368 A | | 7/1998 | Hogan et al. |
| 5,812,828 A | | 9/1998 | Kaufer et al. |
| 5,826,065 A | | 10/1998 | Hinsberg, III et al. |
| 5,838,907 A | * | 11/1998 | Hansen ...................... 709/220 |
| 5,838,918 A | * | 11/1998 | Prager et al. .............. 709/221 |
| 5,872,958 A | | 2/1999 | Worthington et al. |
| 5,880,974 A | | 3/1999 | Tarumi et al. |
| 5,881,268 A | | 3/1999 | McDonald et al. |
| 5,910,903 A | | 6/1999 | Feinberg et al. |
| 6,051,029 A | | 4/2000 | Paterson et al. |
| 6,052,367 A | * | 4/2000 | Bowater et al. ............ 370/352 |
| 6,070,149 A | | 5/2000 | Tavor et al. |
| 6,096,094 A | * | 8/2000 | Kay et al. ..................... 717/1 |
| 6,098,098 A | * | 8/2000 | Sandahl et al. ............ 709/221 |
| 6,122,663 A | * | 9/2000 | Lin et al. ................... 709/100 |
| 6,141,793 A | * | 10/2000 | Bryant et al. ................ 716/3 |
| 6,145,121 A | | 11/2000 | Levy et al. |
| 6,163,779 A | | 12/2000 | Mantha et al. |
| 6,167,534 A | | 12/2000 | Straathof et al. |
| 6,167,567 A | * | 12/2000 | Chiles et al. .............. 709/221 |
| 6,272,555 B1 | * | 8/2001 | Gish ........................... 709/203 |
| 6,324,578 B1 | * | 11/2001 | Cox et al. .................. 709/201 |

FOREIGN PATENT DOCUMENTS

JP  408055129 A  2/1996

OTHER PUBLICATIONS simplyengineering Teams Up With Wolfram Research to Web–Enable Legacy Engineering Modesl; http://www.wolfram.com/new/simplyengineering.html; Mar. 15, 2001.

(List continued on next page.)

*Primary Examiner*—Krisna Lim
(74) *Attorney, Agent, or Firm*—Anton J. Hopen; Smith & Hopen, P.A.

(57) ABSTRACT

A method for configuring and executing a software application with a client user interface, the method including the steps of accessing a master configuration file containing an array of configuration variables controlling the execution of the software application, preselecting a subset of configuration variables from the array of configuration variables contained in the master configuration file, generating the client user interface to modify only the subset of configuration variables, transmitting the client user interface to a client computer, receiving the subset of configuration variables as modified on the client computer, applying the subset of configuration variables against the master configuration file, executing the software application in accordance with the master configuration file on a computational server, the execution of the software application producing an output result, and transmitting the output result to the client computer.

27 Claims, 62 Drawing Sheets

OTHER PUBLICATIONS webMATHEMATICA: The Way the Web Calculates; http://www.wolfram.com/products/webmathematica; Mar. 15, 2001.

simplyengineering: Calculation City; http://www.simply-engineering.com/calculation_city/calculation_city.htm; Mar. 15, 2001.

Application Park Framework Engine; http://www.applicationpark.com/corporate/products/apfe.shtml; Feb. 13, 2001.

simulationcenter, Work smarter. Inovate faster.; http://simulate.engineering-e.com/misc/about.cfm; Feb. 13, 2001.

Product literature "The eMatrix 9 Solution" by MatrixOne, Inc., 2 Executive Drive, Chelmsford, MA 01824.

* cited by examiner

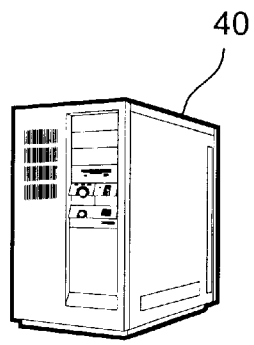
FIG. 4
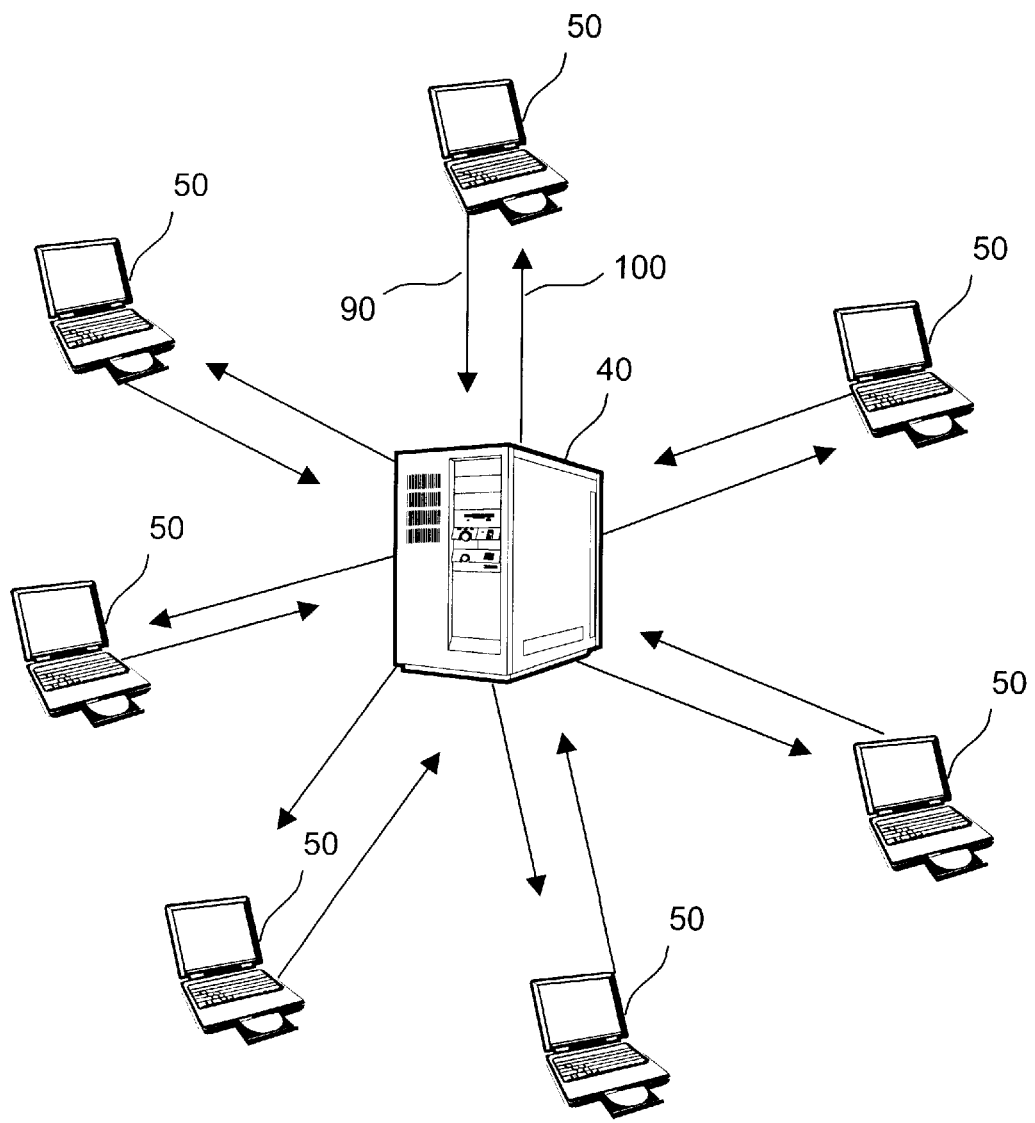

FIG. 21

| Expression Editor | |
|---|---|
| Quantity Label | Symbol |
| Angle Between Pipes | A |
| Density | Den |
| Exit Pipe Length | L |
| Main Pipe Diameter | D1 |
| Mass Flow Rate | M2 |
| Side Pipe Diameter | D2 |
| Temperature | T2 |
| Viscosity | Vis |

Side Pipe Diameter 0.5*D1

Apply    Cancel

Java Applet Window

| Date | User | Application | Status | View |
|---|---|---|---|---|
| 22 Nov 2002 | seb_dewhurst | F3014 Bubble Column | Completed | Results/Parameters |
| 02 Aug 2002 | mat_gerring | T-Junction | Completed | Results/Parameters |
| 15 Jul 2002 | seb_dewhurst | T-Junction | Completed | Results/Parameters |
| 29 Jun 2002 | seb_dewhurst | T-Junction | Completed | Results/Parameters |
| 19 Feb 2002 | mat_gerring | F3014 Bubble Column | Completed | Results/Parameters |
| 17 Jan 2002 | seb_dewhurst | F3014 Bubble Column | Completed | Results/Parameters |
| 30 Nov 2001 | mat_gerring | T-Junction | Completed | Results/Parameters |
| 08 Aug 2001 | seb_dewhurst | Static Mixer | Completed | Results/Parameters |
| 05 Jul 2001 | ian_hawkins | Static Mixer | Completed | Results/Parameters |
| 01 Apr 2001 | ian hawkins | Static Mixer | | Parameters |
| 19 Mar 2001 | seb dewhurst | F3014 Bubble Column | Completed | Results/Parameters |
| 18 Mar 2001 | mat gerring | F3014 Bubble Column | | Parameters |
| 16 Mar 2001 | ian hawkins | Static Mixer | Completed | Results/Parameters |
| 15 Mar 2001 | ian_hawkins | Static Mixer | Completed | Results/Parameters |
| 09 Mar 2001 | ian hawkins | F3014 Bubble Column | Completed | Results/Parameters |

Results Pages: 1 2

FIG. 29

```
WEB SERVER LIST:    // Example configuration file
  WEB SERVER:w0
    Server Virtual Directory = http<SEP>//ihawkins/easadev
    Servlet         Virtual         Directory         =
http<SEP>//ihawkins<SEP>8080/easadev/servlet
  END
  WEB SERVER:w1
    Server Virtual Directory = http<SEP>//chlorine/easadev
    Servlet         Virtual         Directory         =
http<SEP>//chlorine<SEP>8080/easadev/servlet
  END
END
```

FIG. 30

```
LANGUAGE LIST: // Example configuration file
  LANGUAGE: English
    Selection = English
    Date Format = dd-mm-yyyy
  END
  LANGUAGE: American
    Name = American
    Selection = English (U.S.)
    Date Format = mm-dd-yyyy
  END
  LANGUAGE: Japanese
    Name = Japanese
    Selection = Japanese
    Date Format = mm-dd-yyyy
  END
END
```

FIG. 31

```
SOFTWARE LIST // Example configuration file
  SOFTWARE: s1
    Name = CFX-5 Solver
    Monitor Using = cfx5solve.pl
    Check for license using = lmcheck
    LICENSE: L1
      Number Licenses = 1
      License Name = CFX-5-SOLVER, CFX-ANY-SOLVER    // Indicates
either one of the licenses is sufficient
    END
  END
  SOFTWARE: s2
    Name = CFX-5 Build
    Monitor Using = cfx5build.pl
    Check for license using = lmcheck
    LICENSE: L1
      Number Licenses = 1
      License Name = CFX-5-BUILD
    END
    LICENSE: L2
      Number Licenses = 1
      License Name = CFX-5-MESHING
    END
  END
END
```

FIG. 32

```
COMPUTE SERVER LIST // Example configuration file
  MACHINE: s1
    Name = colossus
    Run Simulation Using = rsh $1 &
    Create Directory Using = rsh /usr/bin/mkdir $1
    Copy To Using = ftp $1 $2
    Copy From Using = ftp $2 $1
    Maximum Number of EASA Processes = 3
    Check System Resources Using = rsh /apps/bin/checkLoad.pl
  END
  MACHINE: s2
    Name = archon
    Run Simulation Using = bsub -q normal $1 &
    Create Directory Using = rsh /usr/bin/mkdir $1
    Copy To Using = ftp $1 $2
    Copy From Using = ftp $2 $1
    Maximum Number of EASA Processes = 2
    Check System Resources Using = rsh /apps/bin/checkLoad.pl
  END
END
```

FIG. 33

```
QUEUE LIST // Example configuration file
  QUEUE: q1
    Name = Priority
    Users = ian_hawkins, matt_gerring
    Relative Priority = 5
  END
  QUEUE: q2
    Name = Normal
    Users = Any
    Relative Priority = 1
  END
END
```

FIG. 34

```
REALBOX: D1
  Label = Main Pipe Diameter
  Default = 1, m
  Units = m, cm, mm
END
```

FIG. 35

```
REALBOX: D1
  Label = Main Pipe Diameter
  Default = 1, m
  Units = m, cm, mm
  Upper Bound = 2.0
END
```

FIG. 36

```
REALBOX: D1
  Label = Main Pipe Diameter
  Default = 1, m
  Units = m, cm, mm
END
REALBOX: D2
  Label = Side Pipe Diameter
  Default = 1, m
  Units = m, cm, mm
  Upper Bound = D1
END
```

FIG. 37

```
REALBOX: A
  Label = Angle Between Pipes
  Range Method = Linear
  Default = 90.0, °
END
```

FIG. 38

```
        RECTANGLE: main
          Origin = 0.0, -0.5*D1
          Color  = blue    # Specify a string or three numbers for RGB
          Size = 4*D1+L, D1
        END
        POLYGON: side
          Points = 4*D1+ 0.5*D2*sin(A), 0.5*D2*cos(A), \
                   4*D1+ 0.5*D2*sin(A)  -  4*D1*cos(A),  0.5*D2*cos(A)  +
4*D1*sin(A) , \
                   4*D1 -0.5*D2*sin(A)  -  4*D1*cos(A),  -0.5*D2*cos(A)  +
4*D1*sin(A) , \
                   4*D1 -0.5*D2*sin(A), -0.5*D2*cos(A)
          Color = blue
        END
```

FIG. 39

```
TEMPLATE LIST:
  TEMPLATE: t1
    Software = CFX-5 Build
    Run Using = cfx5build.exe -batch -play tjunc.ses
    File = tjunc.ses
    Delimiter = %
  END
  TEMPLATE: t2
    Software = CFX-5 Solver
    Run Using = cfx5solve -def tjunc.def
  END
  TEMPLATE: t3
    Software = CFX-5 Post
    Run Using = cfx5solve -def tjunc.def
  END
END
```

FIG. 40

```
REALBOX: D2
  Value = 0.3
  Label = Plate Height
  Units = m, cm, mm
  Replace = %D1%
END
```

FIG. 41

| *ASK,height,plate height,%D1% | 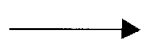 | *ASK,height,plate height,0.3 |

FIG. 42

```
LIBRARY:
  APPLICATION:
    Easa ID = P022
    Release Number = 1.0
    Width = 800
    Height = 800
    Look and Feel = Windows
    Short Title = T-Junction
    Long Title = Turbulent Mixing in T-Junction
    Selection Image = simulation.gif
    Author = AEA Technology
    Author Email = support@easa.aeat.com
    Estimated CPU time = 2.5 h
  END
```

FIG. 43

```
MENUBAR:
  MENU: File
    Label = File
    Position = WEST
    MENU ITEM: New
      Item Action = New
      Label = New
      Default = Available
    END
    MENU ITEM: Open...
      Item Action = Open
      Label = Open...
      Default = Available
    END
    MENU ITEM: About
      Label = About...
      Item Action = About
      DIALOG BOX: About
        Type = INFORMATION_MESSAGE
        Label = About
        Text = Application    CFX-Jet Plane NEWLINE\
               Release        1.0 NEWLINE\
               CFX-Jet Plane is a modelling tool for NEWLINE\
               Computational Fluid Dynamics (CFD)
    END
```

FIG. 44

```
TOOLBAR: name
    BUTTON: buton_name
      Image = fileopen.jpg
      Tool Tip = Open a new EASA application
      Action = Open
    END
    etc...
```

FIG. 45

```
UNIT MANAGER:
  BASE UNITS:
      Mass = kg
      Length = m
      Time = s
      Angle = °
  END
  CONVERSION: density1
    Factor = 0.06243
    Unit    = lb / cu ft
    Base Unit  = kg m^-3
  END
  CONVERSION: density2
    Factor = 3.613E-5
    Unit    = lb / cu in
    Base Unit  = kg m^-3
  END
  CONVERSION: density3
    Factor = 0.001
    Unit    = g / cc
    Base Unit  = kg m^-3
  END
  CONVERSION: acceration1
    Factor = 3.281
    Unit    = ft s^-2
    Base Unit  =   m s^-2
  END
  CONVERSION: acceration2
    Factor = 2.237
    Unit    =   (mile/h)/s
    Base Unit  = m s^-2
  END
  CONVERSION: acceration3
    Factor = 3.6
```

FIG. 46

```
USER INTERFACE:
  TABBED PANE LIST:
     TABBED PANE: mytabbedpanel
        Diagram = mydiagram
        Tab = myname
        SUB PANE: mysubpanel
           ...
        END
     END
  END
```

FIG. 47

```
SUB PANE: mysubpanel
   Border = Burner Flow Rate
   REALBOX: myREALBOXname1
      ...
   END
   REALBOX: myREALBOXname3
      ...
   END
   SELECTOR: myselector1
      ...
   END
END
```

FIG. 48

```
REALBOX: myrealboxname1
   Default = 50, m
   Units = m, cm, mm
   Label = d1
   Value = 10, m
END
```

FIG. 49

```
LOGICAL: mylogical1
  Default = True
  Label = Transparent
  Value = False
END
```

FIG. 50

```
REALBOX: D1
  ...
END

REALBOX: a2
  Upper Bound = D1
END
```

FIG. 51

```
CHOICE LIST: c1
  Choices = Massflow, Velocity, Pressure
  Default = Massflow
  Value = Velocity
  Label = Inflow Option
END REALBOX: Velocity
  Show if = c1 eq inflow
END
```

FIG. 52

```
SELECTOR: myselector
  Name = Impeller
  Create Name = Create
  Delete Name = Delete
  Values = Upper, Lower
END
```

FIG. 53

```
SELECTOR DEFAULT: s1
  SUB PANE:sp1
    REALBOX: X
      Tool Tip = X location of baffle
      Label = X
      Default = 0.02, m
      Unit = m, cm
      Replace = %X%
      Lower Bound = L/100.0
      Upper Bound = L-L/100.0
    END
    CHOICE LIST: c1
      Choices = Red, Green, Orange, Blue
      Default = Red
      GUI Name = Color
    END
  END
```

FIG. 54

```
SELECTOR PANE: upper1
  SUB PANE:sp1
    REALBOX: X
      Value = 0.1
    END
    CHOICE LIST: c1
      Value = Red
    END
  END
END SELECTOR PANE: upper1
  SUB PANE:sp2
    REALBOX: X
      Value = 0.2
    END
    CHOICE LIST: c1
      Value = Green
    END
  END
END
```

FIG. 55

```
RECTANGLE: myrectanglename
  Color = redEND
  Outline = black

Origin = 20,30
  Size = 40,50
END

OVAL: myovalname
  Color = red
  Outline = black
  Origin = 20,30
  Size = 40,50
END POLYGON: mypolyname
  Color = red
  Outline = black
  Points = 20,30  20,40  30,40
```

FIG. 56

```
GROUP: Wing Assembly
  POLYGON: main wing
    Fill Color = red
    Points = 20,30,  20,40, ...
  END
  POLYGON: flap
    Fill Color = blue
    Points = 25,32,  25,36, ...
  END
  TRANSFORMED GROUP: MyEngine
    Group Name = RR Engine
    Transformation List = Translate, 10, 20
  END
END DIAGRAM: Plane
  TRANSFORMED GROUP: body
     Group Names = 747 Body, Undercarriage
     Transformation List = Translate, 10, 20
  END
  TRANSFORMED GROUP: wing1
     Group Names = Wing Assembly
     Transformation List = Translate, 30, 25
  END
  TRANSFORMED GROUP: wing2
     Group Names = Wing Assembly
```

FIG. 57

```
TEMPLATE LIST:
  TEMPLATE: T1
    Software = CFX-5 Build Session File
    Run Using = cfx5build.exe -batch -play tjunc.ses
    File = tjunc.ses
    Percent of Simulation Time = 10
    Delimiter = %
  END
  TEMPLATE: T2
    Software = CFX-5 Solver
    Run Using = cfx5solve -def tjunc.def
    Percent of Simulation Time = 80
  END
  TEMPLATE: T3
    Software = CUE Post
    File = tjunc.cue
    Run using = cfx5cue -play tjunc.cue -res tjunc_001.res
    Percent of Simulation Time = 10
    CLEAR FILESPACE:
      Delete = *.db, *.out, *.def
      Compress = *.res
    END
  END
END
OUTPUT:
  PLOT: p1
    File = p1.gif
    Thumbnail = p1a.gif
    GUI Title = Maximum and Minimum temperature along length of Pipe
  END
  PLOT: p2
    File = p2.gif
    Thumbnail = p2a.gif
    GUI Title = Maximum and Minimum scalar along length of Pipe
  END
  DATA: q1
    File = q1.dat
    GUI Title = Pressure Drop
  END
  TABLE: t1
```

FIG. 58

```
TABBED PANE
  Target = T1
  REALBOX: d1
    Label = Angle Between Pipes
    Value = 45
    Replace = %ANG%
```

FIG. 59

```
REALBOX: Angle Between Pipes
  Range Allowed = True
  Method = Linear
  Start Value = 30, degrees
  End Value =   45, degrees
  Number of Values = 4
  Replace = %ANG%
END
```

FIG. 60

```
OUTPUT:
  HTML:
    text = <B> My text </B>
  END
  PLOT: i1
    Link = g1.wrl
    Image = g1.gif
    Title = Illustration of geometry
  END
  RESULTS TABLE: pt1
    Title = Thermal Data
    PLOT: p1
      Link = p1.gif
      Thumbnail = p1a.gif
      Title = Maximum and Minimum temperature along length of Pipe
    END
    PLOT: p2
      Link = p2.gif
      Thumbnail = p2a.gif
      Title = Maximum and Minimum scalar along length of Pipe
    END
    DATA: q1
      File = q1.dat
      Title = Pressure Drop
    END
  END
  DATA: q1
    File = q1.dat
    Title = Pressure Drop
  END
  TABULATED DATA: t1
    File = t1.dat
    Title = Temperature Variation along Pipe
    Column Titles = Distance, Temperature
    Separator = ,
    Downloadable = true
  END
  LINEGRAPH: lg1
```

FIG. 61

```
REALBOX: Angle Between Pipes
   Value = 45
   Lower Bound = 15, degrees
   Upper Bound = 175, degrees
END
```

FIG. 62

```
ERROR LIST:
   DIALOG BOX: Upper Bounds Exceeded
      Type = ERROR_MESSAGE
      Label = Error
      Replace String = UPPER
      Text  = Value entered is greater than upper bound. NEWLINE\
              The  current  allowed  value  must  be  less  than  UPPER. NEWLINE\
                              Resetting to previous value.
   END
   DIALOG BOX: Lower Bounds Exceeded
      Type = ERROR_MESSAGE
      Label = Error
      Replace String = LOWER
      Text  = Value entered is less than lower bound. NEWLINE\
              The current allowed value must be greater than LOWER.
              Resetting to previous value.
   END
   DIALOG BOX: Invalid Value Entered
      Type = ERROR_MESSAGE
      Label = Error
      Replace String = VALUE
      Text  = Invalid value entered, VALUE. NEWLINE\
                          Resetting to previous value.
   END
   DIALOG BOX: Working Dir Invalid
      Type = ERROR_MESSAGE
      Label = Error
```

FIG. 63

```
REALBOX: A1
  Value = 45
END

ERROR LIST:
  ERROR: E1
    Condition = (D1/tan(A1) + D2/sin(A1)) > L1
    Text = Angle is too large for specified pipe exit length
  END
END WARNING LIST:
  WARNING: W1
    Condition = A1 > 90 degrees
    Text = Pipe angle is > 90 degrees which means that flow is\
           being injected upstream into the main pipe.
  END
```

FIG. 64

```
SELECTOR ERROR: sel     # (or SELECTOR WARNING:)
   Selector = Impellers
   Condition = A_y2 < B_y1 || A_y2 > B_y2
   Text = Impeller Overlap.
END
```

```
LIBRARY:
    APPLICATION:
        Easa ID        = P012
        Release Number = 1.0
        Form Width     = 800
        Form Height    = 800
        Look and Feel  = Windows
        Long Title = Turbulent Mixing in T-Junction
    END
END

USER INTERFACE:

TEMPLATE LIST:
      TEMPLATE: T1
        Type = CFX-5 Build Session File
        Filename = tjunc.ses
        Version = 5.4
      END
      TEMPLATE: T2
        Type = CUE Post
        Filename = tjunc.cue
        Version = 5.5
      END
```

FIG. 67

```
#-- Standard section to be inserted here for fixed EASA menus
such as Save/Help TABBED LIST: tl1

-- Geometry specification:

TABBED PANE: tp1
          Target = T1
          Diagram = diag1
          Tab = Dimensions REALBOX: rD1
          Tool Tip = Main Pipe Diameter
          Label = D1
          Default = 1.0, m
          Unit = m, cm
          Replace = %D1%
          Lower Bound = 1.0E-3, m
       END
       REALBOX: rD2
          Tool Tip = Side Pipe Diameter
          Label = D2
          Default = 0.5, m
          Unit = m, cm
          Replace = %D2%
          Upper Bound = rD1
       END
       REALBOX: rA
          Tool Tip = Angle Between Pipes
          Label = A
          Default = 45, degrees
          Unit = degrees
          Replace = %ANG%
          Lower Bound = 15, degrees
          Upper Bound = 175, degrees
       END
       REALBOX: rL1
          Tool Tip = Exit Pipe Length
          Label = L1
          Default = 2.0, m
```

FIG. 68

```
#-- Physics specification:

TABBED PANE: tp2
      Image = l1.gif
      Target = T1
      Tab = Fluid

REALBOX: rDen
        Tool Tip = Density
        Label = Den
        Default = 1000.0, kg/m^3
        Unit = kg/m^3
        Replace = %DENSITY%
        Lower Bound = 1.0E-10
      END
      REALBOX: rVis
        Symbol = Vis
        Default =  1.0E-3, kg m^-1 s^-1
        Replace = %VISCOSITY%
        Unit = kg m^-1 s^-1
        Lower Bound = 1.0E-10
      END
```

FIG. 69

```
#-- Flow conditions:

TABBED PANE: tp3
      Image = 12.gif
      Tab = Flow Conditions
      Target = T1

SUB PANE: c1
      Border = Main Pipe

CHOICE LIST: mychoicelist
        Label = Inflow Specification
        Choices = Massflow, Velocity
        Default = Massflow
      END REALBOX: rM1
        Label = M1
        Tool Tip = Mass Flow Rate
        Default = 1000.0, kg/s
        Unit = kg/s
        Replace = %MAIN_MASS_FLOW%
        Show if = c1 eq Massflow
      END REALBOX: rVel1
        Label = V1
        Tool Tip = Normal Velocity
        Default = 1, m/s
        Unit = m/s
        Replace = %MAIN_VELOCITY%
        Show if = c1 eq Velocity
        Lower Bound = 0, m/s
      END REALBOX: rT1
        Tool Tip = Inflow Temperature
        Label = T1
        Default = 35.0, C
```

FIG. 70

```
SUB PANE: sp2
  Border = Side Pipe

CHOICE LIST: c2
    Label = Inflow Specification
    Choices = Massflow, Velocity
    Default = Massflow
  END REALBOX: d20
    Label = M2
    Tool Tip = Side Flow Rate
    Default = 1000.0, kg/s
    Unit = kg/s
    Replace = %SIDE_MASS_FLOW%
    Show if = c2 eq Massflow
  END REALBOX: d21
    Label = V2
    Tool Tip = Normal Velocity
    Default = 1, m/s
    Unit = m/s
    Replace = %SIDE_VELOCITY%
    Target = T1
    Show if = c2 eq Velocity
    Lower Bound = 0, m/s
  END REALBOX: rT2
    Tool Tip = Inflow Temperature
    Label = T2
    Default =  35.0, C
    Unit =  C
    Replace = %MAIN_T%
  END END # sp2
```

FIG. 71

```
   WARNING LIST:
     WARNING: w1
       Condition = rDen*D1*Vel1/rVis < 10000
       Text = The flow regime of the simulation setup is \
                   only just turbulent and is therefore at the limits
\
                   of the parameter space we would recommend using
this \
                   EASA for.

END
     WARNING: w2
       Condition = rDen < 0.01, kg/s
       Text = The density of the fluid has been set lower than is \
                   typical. It may be worth checking this prior to\
                   running the simulation.
     END

END

ERROR LIST:
     # Notes if term is unset due to "show if" then an error
     # should not be checked.
     ERROR: e1
       Condition = rDen*rD1*rVel1/rVis < 1000
       Text = The flow regime of the simulation setup is \
                   not turbulent.
     END
     ERROR: e2
       Condition = rM1/(rVis*rD1) < 1000
       Text = The flow regime of the simulation setup is \
                   not turbulent.
     END
     ERROR: e3
       Condition = rVel1 < 0
       Text = The inflow velocity must be positive.
     END
     ERROR: e4
       Condition = rL1 > 100*rD1
       Text = Exit length has been set too long.
     END
     ERROR: e5
```

FIG. 72

```
DIAGRAM LIST:
  GROUP: side pipe
    RECTANGLE: side pipe
      Color = blue
      Origin = 0, -0.5*rD2
      Size = -4*rD1,rD2
      Layer = -1
    END
    LINE: dim2
      Points = -4.1*rD1, 0,  -4.1*rD1, rD2
    END
    TEXT: tdim2
      Origin = -4.2*rD1, 0.5*rD2
      Label = D2
    END
  END DIAGRAM: diag1

RECTANGLE: upstream main pipe
      Color = blue
      Origin = -4*rD1,-0.5*rD1
      Size = 4*rD1,rD1
    END
    LINE: dim1
      Points = -4.1*rD1, 0, -4.1*rD1, rD2
    END
    TEXT: tdim2
      Origin = -4.2*rD1, 0.5*rD1
      Label = D1
    END RECTANGLE: downstream main pipe
      Color = blue
      Origin = 0, 0
      Size = rL1,rD1
    END
    LINE: dim1
      Points = 0, -0.6*rD1, -4.0*rD1, -0.6*rD1
    END
    TEXT: tdim2
```

FIG. 73

```
      ARC: dimang
        Origin = 0,0
        Angle = rANG
        Layer = -1
        Radius = 0.3*rD1
      END
      LINE:
        Points = 0, 0.0, 0.0, -0.5*D1
      END
      LINE:
        Points = 0, 0.0, 0.5*D1*cos(rANG), 0.5*D1*sin(rANG)
      END
      TEXT:
        Origin = 0.4*D1*cos(rANG*0.5), 0.4*D1*sin(rANG*0.5)
        GUI Label = A
      END
      TRANSFORM GROUP: tg1
        Group Names = side pipe
        Transformation List = Rotate, rAng, 0, 0
      END
    END
  END END # GUI definition
```

METHOD FOR ACCESSING COMPLEX SOFTWARE APPLICATIONS THROUGH A CLIENT USER INTERFACE

BACKGROUND OF INVENTION

1. Field of Invention

This invention relates to a method for accessing software applications, and more specifically to a method of generating a client user interface for executing complex, preconfigured software applications.

2. Background of the Invention

For the great majority of consumer software applications, considerable resources are attributed to the design of the user interface (herein "UI"). Not only are well developed UIs aesthetically pleasing to the end user, they also serve to reduce the perceived complexity of a software application. Major players in the operating system market such as Microsoft® and Apple® strongly market the ease of use and attractiveness of their UIs. Nearly every major release of the Windows® operating system has included a substantial revision of the UI. Even the latest version of the Windows line of operating system, XP, touts its UI: "the familiar Windows interface has been enhanced to make it even easier to use. New visual cues help you find important information, and the redesigned Start menu makes it easier to access the programs you use most frequently." Microsoft's major competitor in the operating system market, Apple, bills its new Aqua™ interface with the following copy: "Your operating system can contribute to screen clutter by spawning multiple windows. Navigating deep structured file systems, for instance, involves opening more and more windows, obscuring your view of the desktop. Mac OS X eliminates the problem of multiplying windows by focusing many of its applications in a single window. Key system components like the new Finder, Mail and the System Preferences panel are presented in a single window. The result? A clean uncluttered look." UI enhancements lower the learning curve for operating a software application. Careful thought and consideration in the UI design leads to systems that place information in clearly understood format and in anticipated locations.

Even for traditionally command-line (herein "CL") operating systems, UI applications such as GNOME, KDE, and X Window are notoriously well known. GNOME (GNU Network Object Model Environment) is a graphical user interface (herein "GUI") and set of computer desktop application for users of the Linux computer operating system. It's intended to make a Linux operating system easy to use for non-programmers and generally corresponds to the Windows desktop interface and its most common set of applications. Matthias Ettrich launched the KDE project in October 1996 with the goal of making the UNIX platform more attractive and easy to use for computer users who are familiar with a graphical interface instead of typed commands. Today, KDE is used with Linux, Solaris, FreeBSD, OpenBSD, and LinuxPPC. X Window is primarily used in networks of interconnected mainframes, minicomputers, and workstations. It is also used on the X terminal, which is essentially a workstation with display management capabilities but without its own applications.

Despite the interest and investment in GUIs for virtually every computer platform, CL interfaces continue to thrive, albeit in less consumer-oriented products, and more-particularly, in batch-file driven applications. A batch file is a text file that contains a sequence of commands for a computer operating system. It's called a batch file because it batches (bundles or packages) into a single file a set of commands that would otherwise have to be presented to the system interactively from a keyboard one at a time. A batch file is usually created for command sequences for which a user has a repeated need. Commonly needed batch files are often delivered as part of an operating system. One initiates the sequence of commands in the batch file by simply entering the name of the batch file on a command line. In the Disk Operating System (DOS), a batch file has the file name extension ".BAT". (The best known DOS batch file is the AUTOEXEC.BAT file that initializes DOS when one starts the system.) In UNIX-based operating systems, a batch file is called a shell script. In IBM's mainframe VM operating systems, it's called an EXEC.

For current software applications, batch file processes are often used in complex engineering and financial tools. An example of an application which may be batch-driven is the CFX® family of engineering software products developed by AEA Technology plc based in Oxfordshire, United Kingdom (herein "AEA"). However, even with major improvement in making new versions of CFX® easier to use, the learning curve for users takes weeks to months to overcome. An application such as CFX® must be general enough to handle computational fluid dynamic problems ranging from supersonic flow to heat transfer to vascular flow. Therefore, the general purpose, and therefore complex, interface associated with such applications cannot be supplanted without a substantial loss of functionality. The general-purpose user interfaces available in such tools provides a wide range of modeling capability, but unfortunately results in steep learning curves. As a result, only a small number of users are capable of creating a ground-up simulation in CFX, although a large number of users may want access to the application. For example, a ground up simulation created for a fluid flow on a five-centimeter pipe may offer an expensive one-time solution for an on-site engineer. However, if the engineer wanted to know what would happen if the five-centimeter pipe was replaced by a three-centimeter pipe, the engineer would have to contact the highly trained CFX® user to modify the previously written simulation to modify the pipe dimensions. This results in a loss of productivity for both parties: the on-site engineer waiting for the new results and the CFX® user distracted from authoring new simulations.

It should be noted that GUIs are often provided for complex, batch-driven applications, yet even best efforts to make a GUI easy to operate still result in a high learning curve if the configuration and execution of the application is still complex. For example, GUIs currently used in drafting and engineering application may have literally hundreds of nested buttons accessible in a single screen interface. This information overload substantially raises the learning curve for operating the software application, particular when only the modification of a handful of variables is necessary for the objectives of the end user.

Another problem with complex, batch driven software is the inefficient utilization of the licensing fees. Engineering software such as CFX® is more costly to license by magnitudes when compared to even the most expensive software commonly known to laypersons. Accordingly, licensees of the software wish to utilize the application as much as possible to obtain a return on their investment. However, because the learning curve is so high for complex software applications, usually only a limited number of users are capable of utilizing the software, even though a large number of company employees wish to frequently access the application. Similar to licensing concerns is that of CPU utilization. Complex and expensive software often requires complex and expensive computers to run them. An idle CPU represents poor utilization of a company's investment in its computational infrastructure.

Still another problem in the art is that of remote access. Going back to the example of the onsite engineer, the CFX® system would only be available if it was installed on a remote computer with sufficient computational power to operate, or alternatively for a remote access application such as CITRIX® or Windows Terminal Services (herein "TS"). However, even CITRIX® and TS solutions only provide a bitmap emulation of the local user interface. The onsite engineer is still faced with the complexities of the software application even though the simulation has largely been authored but for some modifications in a small array of variables. Furthermore, even the most efficient terminal screen emulations generally require a substantial amount of network bandwidth to operate without distracting latency.

An ever-increasing area of corporate development is mining knowledge databases. Companies frequently generate large stores of information, which, if efficiently accessed, produce substantial gains in productivity. However, in the field of complex software applications, sophisticated processes authored by a few highly trained computer specialists are not accessible by other users in the company. These processes might be focused on engineering, as is the case for CFX software, or focused on financial applications such as Agresso Business World products developed by Agresso Group ASA headquartered in Oslo, Norway. Regardless of the target of the applications, valuable intellectual property is left untapped by the majority of a company simply due to the "front-end" complexity of the software application.

Still another problem in the prior art is that of employee turnover. When an expert user leaves a company, much of the expert's knowledge leaves with that person. What is needed is a method to encapsulate the expert's work product into a system that may be easily accessed by novice users even in the absence of the expert. Value exists in an expert's ability to apply complex software solutions to the specific needs of a particular company.

A number of patents exist relating to client-server processing of complex software applications such an engineering simulations. U.S. Pat. No. 5,778,368 to Hogan et al. and assigned to Telogy Networks, Inc. describes a system to permit re-use of real-time embedded software. The Hogan patent does discuss simulations in client-server architecture. However, the Hogan patent does not teach the distillation of complex simulations into end-user, client forms which may be manipulated without specialized knowledge of the simulation software. U.S. Pat. No. 5,826,065 to Hinsberg et al. and assigned to IBM Corporation describes an object-oriented architecture for stochastic simulation of chemical reactions and transport wherein the programmer only makes certain user interface options available to permit an end user to configure the simulation at runtime. However, this is achieved through an array of simulation objects employed in an object-oriented architecture. Japanese Patent No. JP408055129A to Oshima and assigned to Toppan Printing Company describes a batch file-driven system for image processing but provides no suggestion as to reducing the complexity of administration and execution. U.S. Pat. No. 5,872,958 to Worthington et al. and assigned to IBM Corporation describes a method of modeling hardware component dependencies. The Worthington does not suggest or describe a streamlined client-server interface to remove the learning curve and complexities of sophisticated simulation and financial software.

Unfortunately, none of the references available in the prior art disclose, teach or suggest a solution to the aforementioned problems.

Accordingly, what is needed in the art is a method for generating an easy to use front-end UI for previously configured complex software applications.

Another need exists in the art for a method to efficiently and easily create the above-mentioned front-end UI regardless of the type of software application.

Another need exists in the art for a method to more efficiently utilize CPU time.

Another need exists in the art for a method to more efficiently utilize software license seats.

Another need exists in the art for a method to reduce bandwidth considerations for remote application configuration, processing and analysis.

Another need exists in the art for a method to better capture enterprise knowledge as it relates to complex software configuration and processing.

Another need exists in the art for a method to encapsulate the expert's work product into a system that may be easily accessed by novice users even in the absence of the expert.

It is, therefore, to the effective resolution of the aforementioned problems and shortcomings of the prior art that the present invention is directed.

However, in view of the prior art in at the time the present invention was made, it was not obvious to those of ordinary skill in the pertinent art how the identified needs could be fulfilled.

SUMMARY OF INVENTION

The present invention comprises a method for configuring and executing a software application with a client user interface, the method comprising the steps of accessing a master configuration file containing an array of configuration variables controlling the execution of the software application, preselecting a subset of configuration variables from the array of configuration variables contained in the master configuration file, generating the client user interface to modify only the subset of configuration variables, transmitting the client user interface to a client computer, receiving the subset of configuration variables as modified on the client computer, applying the subset of configuration variables against the master configuration file, executing the software application in accordance with the master configuration file on a computational server, the execution of the software application producing an output result, and transmitting the output result to the client computer.

It should be noted that instead of only a single master configuration file, a plurality of master configuration files may be accessed and modified by the present invention. Furthermore, a plurality of software applications may be executed in a preselected order wherein the results are aggregated into a single output. Therefore, the present invention may configure and drive a plurality of software applications, each employed collectively to solve a discrete problem.

In a preferred embodiment of the invention, additional steps include storing in the master configuration file access instructions to a plurality of computational servers available to execute the software application, configuration settings for displaying a plurality of languages in the client user interface, and licensing information for managing available licenses to permit the execution of the software application.

In order to accommodate a plurality of client computer requests for processing, additional steps may include receiving substantially concurrently a plurality of subsets, storing the plurality of subsets prior to execution on the computational server, and executing each subset as the computational server becomes available for processing. Queuing data may be stored to establish a relative execution priority of the plurality of subsets and a processing status report may be transmitted to the client user interface to indicate how long it will take before the results are computed and ready for review.

The preselected subset of configuration variables may be written to a template file wherein the form and appearance of client user interface is defined by the template file.

A default measurement unit may be preselected for at least one variable of the preselected subset of configuration variables. Such measurement unit might be meters, centimeters, centigrade or the like. To provide flexibility in data input, a plurality of measurement units selectable for at least one variable of the preselected subset of configuration variables may be preselected.

A default value for at least one variable of the preselected subset of configuration variables may also be preselected. Permissible bounds may be established for the client-inputted variables for an individual variable. In addition, permissible bounds may also be established for one variable relative to the value of a second variable.

In order that the user interface is easy to understand, a text string description of each variable may be established. A plurality of values may be accepted by establishing an input means to accept a range of values with linear stepping. The values may be distributed linearly, logarithmically, or arbitrarily.

In addition to the text descriptions as provided above, the client interface may be greatly enhanced by predefining at least one graphic representation of the subset of configuration variables for display on the client user interface and modifying the at least one graphic representation responsive to a modification in at least one variable of the preselected subset of configuration variables. At least one dimension value in visual proximity to the at least one graphic representation may be displayed. In addition, a mouse-over or text box entry event may be used to trigger the step of making visible a first dimension value responsive to a modification of a first variable of the preselected subset of configuration variables and making the first dimension value invisible responsive to a modification of another variable of the preselected subset of configuration variables. To further lower the learning curve necessary to operate the client interface an additional step may include displaying a plurality of images on the client user interface, at least one variable of the preselected subset of configuration variables being modified responsive to the selection of an individual image within the group of the plurality of images.

An important feature of the present invention is the ease in which complex and legacy software applications may be modified and executed. A preexisting configuration variable in the master configuration file is replaced with a machine-readable identifier. When the modified variables are received from the client computer, the master configuration file is parsed wherein the corresponding configuration variable replaces the machine-readable identifier. The user-defined configuration variables may be accepted as a binary or ASCII file upload or as a delimited string post.

A preferred integration of systems for the invention includes establishing a computational server running at least one software application, establishing an application server communicatively coupled to the computational server, establishing a communications pathway from the application server to at least one client computer, the communications pathway adapted to transmit data for displaying a graphic user interface on the client computer, accessing a master configuration file containing an array of configuration variables controlling the execution of the software application, preselecting a subset of configuration variables from the array of configuration variables contained in the master configuration file, establishing a template file wherein the subset of configuration variables and the appearance of the graphic user interface are defined by the template file, storing the template file on a storage medium communicatively accessible by the application server, transmitting the template file to the client computer, responsive to receiving an array of modified configuration variables from the client computer, applying the array of modified configuration variables to the master configuration file, executing the software application in accordance with the master configuration file on the computational server, outputting a result, and transmitting the result to the client computer.

It is therefore an object of the present invention to provide a method for generating an easy to use front-end UI for previously configured complex software applications.

It is another object of the present invention to provide a method to efficiently and easily create the above-mentioned front-end UI regardless of the type of software application.

It is another object of the present invention to provide a method to more efficiently utilize CPU time.

It is another object of the present invention to provide a method to more efficiently utilize software license seats.

It is another object of the present invention to provide a method to reduce bandwidth considerations for remote application configuration, processing and analysis.

It is another object of the present invention to provide a method to better capture enterprise knowledge as it relates to complex software configuration and processing.

An advantage of the invention is that novice users may utilize complex software applications without enduring a high learning curve.

Another advantage of the invention is that specialists who are trained to use the complex software application need not be distracted by requests to modify a limited subset of variables in an existing master configuration file.

Another advantage of the invention is that a plurality of novice users may access a library of preexisting software configurations that already meet the requirements of the computing task without incurring the expense of configuring a computing task from the ground up.

Another advantage of the invention is that a larger number of users may engage the computational servers, thus better utilizing existing resources.

Another advantage of the invention is that a larger number of users may utilize an existing software license.

Another advantage of the invention is that users are provided a rich, graphical interface for what may normally be a command line software application.

Another advantage of the invention is that users are provided graphic feedback responsive to changes in the variables modifiable in the user interface.

Another advantage of the invention is that legacy client hardware and limited bandwidth may easily accommodate the end user as only configuration variables and post-processing results are transmitted as opposed to terminal emulation solutions.

Another advantage of the invention is that an expert user's ability to apply complex software solutions to the specific needs of a particular company is encapsulated into the system so that it may be easily be accessed by novice users even in the absence of the expert. It is to be understood that both the foregoing general description and the following detailed description are explanatory and are not restrictive of the invention as claimed. The accompanying drawings, which are incorporated in and constitute part of the specification, illustrate embodiments of the present invention and together with the general description, serve to explain principles of the present invention.

Another advantage of the invention is that a single user interface may be configured to drive and obtain results from a plurality of separate underlying applications.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which:

FIG. 4 is an illustration of a computational server accepting requests for application execution by a plurality of remotely located client computers.

FIG. 21 is a dialog box illustration of an expression editor wherein the value of a first variable may be defined by the value or values of one or more second variables.

FIG. 23 is a screen shot illustration of an activated menu item providing selections for a grouping of simulation applications.

FIG. 26 is a screen shot illustration of a queue display showing a number of completed executions and two pending executions.

FIG. 29 is the text of a configuration file which allows for specification of multiple servers to allow for redundancy if a server is down.

FIG. 30 is the text of a configuration file which indicate the languages to be displayed to end users.

FIG. 31 is the text of a configuration file which defines the application software available for use according to license availability.

FIG. 32 is the text of a configuration file which specifies on which computational servers the application software is run.

FIG. 33 is the text of a configuration file which allows an administrator to customize the queuing on the computational servers.

FIG. 34 is the text of a configuration file which specifies a data entry box for display on the user interface.

FIG. 35 is the text of a configuration file which specifies a data entry box with data checking for display on the user interface.

FIG. 36 is the text of a configuration file which specifies a data entry box with data checking relative to other data for display on the user interface.

FIG. 37 is the text of a configuration file which provides for accepting parameter ranges by adding a range method, the resultant dialog box is shown in FIG. 10.

FIG. 38 is the text of a configuration file which provides graphic representations responsive to data entered in the user interface and illustrated in FIGS. 11–14.

FIG. 39 is the text of a configuration file which specifies three software application that are run responsive to receipt of data from the user interface.

FIG. 40 is the text of a configuration file which provides mapping to individual variables in the template files.

FIG. 41 is an illustration of the replacement of the machine readable identifier with an actual value retrieved from the client interface.

FIG. 42 is the text of a configuration file of a template header according to the invention.

FIG. 43 is the text of a configuration file of user interface controls according to the invention.

FIG. 44 is the text of a configuration file of a template toolbar button graphic and action.

FIG. 45 is the text of a configuration file of an array of unit definitions.

FIG. 46 is the text of a configuration file of a tabbed pane interface control.

FIG. 47 is the text of a configuration file of a sub-pane interface control.

FIG. 48 is the text of a configuration file of an object for inputting data.

FIG. 49 is the text of a configuration file for defining a logical.

FIG. 50 is the text of a configuration file for a reference procedure.

FIG. 51 is the text of a configuration file for a choice list.

FIG. 52 is the text of a configuration file for a selector object.

FIG. 53 is the text of a configuration file for a selector default object.

FIG. 54 is the text of a configuration file for storing user entered data.

FIG. 55 is the text of a configuration file for providing dynamic graphic feedback.

FIG. 56 is the text of a configuration file for reusable groups of diagrams.

FIG. 57 is the text of a configuration file for a template specification.

FIG. 58 is the text of a configuration file wherein data set by the user interface is associated with the template specification.

FIG. 59 is the text of a configuration file wherein a linear parametric range is allowed for an angle between pipes.

FIG. 60 is the text of a configuration file specifying the layout information for displaying results.

FIG. 61 is the text of a configuration file for immediate error checking.

FIG. 62 is the text of a configuration file for storing a plurality of error messages.

FIG. 63 is the text of a configuration file for carrying out errors checks prior to execution of the software application.

FIG. 64 is the text of a configuration file for carrying out error checks on repeated data.

FIG. 67 is the text of a configuration file for the simulation task of FIG. 65 according to the invention.

FIG. 68 is the text of a configuration file for the simulation task of FIG. 65 according to the invention.

FIG. 69 is the text of a configuration file for the simulation task of FIG. 65 according to the invention.

FIG. 70 is the text of a configuration file for the simulation task of FIG. 65 according to the invention.

FIG. 71 is the text of a configuration file for the simulation task of FIG. 65 according to the invention.

FIG. 72 is the text of a configuration file for the simulation task of FIG. 65 according to the invention.

FIG. 73 is the text of a configuration file for the simulation task of FIG. 65 according to the invention.

DETAILED DESCRIPTION

Figure 1:
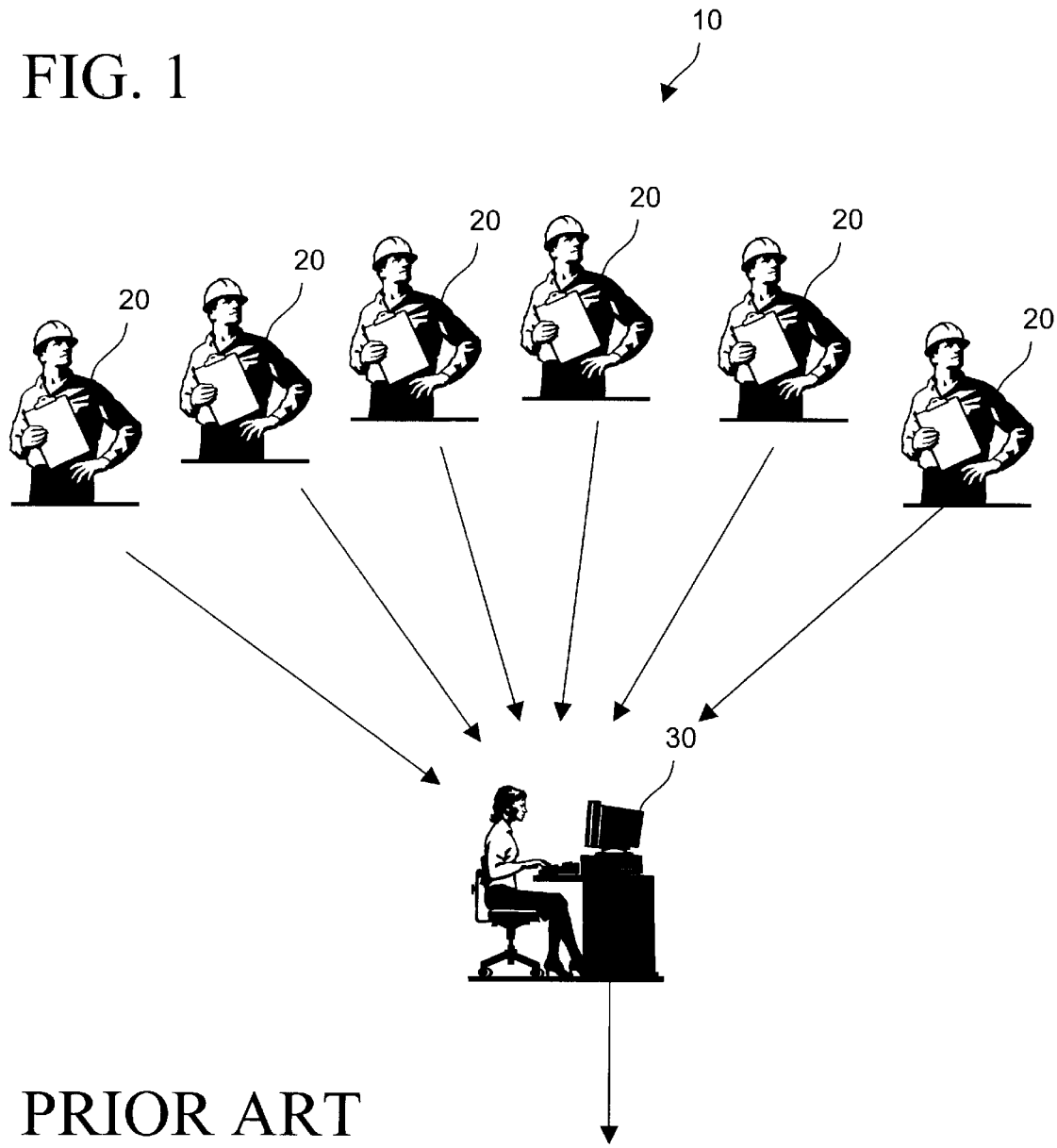
FIG. 1 is an illustration of the prior art wherein a plurality of novice users place requests with an expert user to configure and execute a complex software application.

FIG. 1 shows the prior art denoted as a whole by the numeral 10. Many organizations utilize complex software applications for engineering, financial, and database tasks. While a large number of novice users 20 require the results produced by the software applications, a bottleneck exists in the workflow as only a limited number of expert users 30 have the training and experience necessary to effectively configure and execute the complex software. Typically, the novice users 20 must make a request to the expert user 30 for a specific modification to the complex software. The expert user 30 may already have a library of preconfigured settings able to accommodate the request, but must manually adjust those settings and send the job off to one or more computational servers 40 for processing. When the results are available, the expert must in turn transmit the results to the novice user 20. In addition, because only limited number of expert users 30 are available for sending jobs to the computational servers 40 the servers may sit idle, thereby failing to utilize their potential of working continuously. Yet another problem with the prior art is that of accessibility. Many complex applications as well as legacy systems are unavailable through a LAN or WAN. Furthermore, client user legacy hardware and bandwidth limitation incurred by remote, novice users 20 also restrict access to complex software applications.

Figure 2:
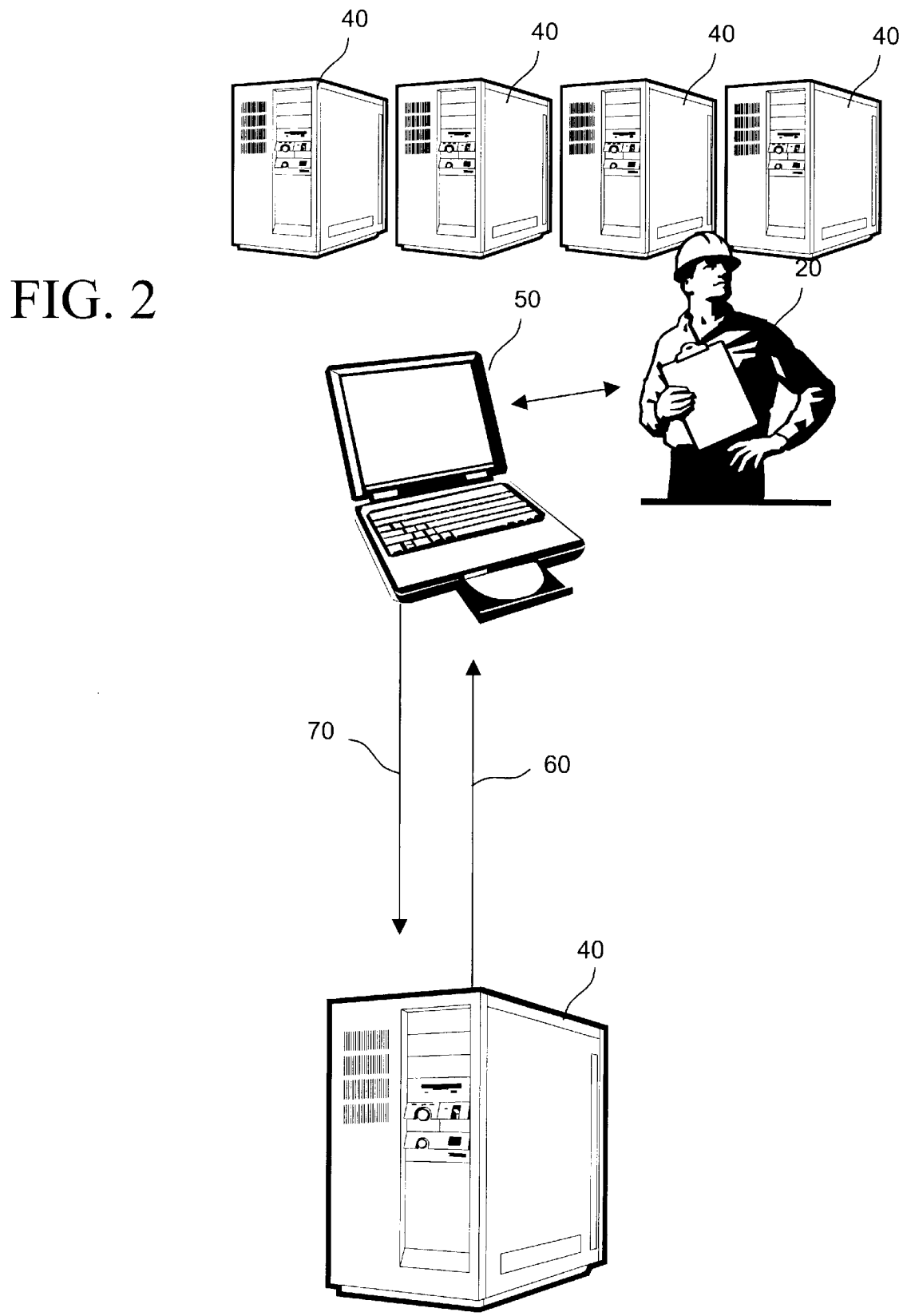
FIG. 2 is an illustration of the prior art wherein a terminal emulation of the complex software application is provided to remotely located novice user.

FIG. 2 illustrates a prior art solution to remote access. A novice user 20 accesses a client computer 50. The keystroke, pointing device, and other client-side input means are transmitted 70 to a terminal emulation application which in turn, sends a bitmap emulation of the local terminal 60 back to the client computer 50. Such terminal emulations are notoriously well-known in the art and include commercial applications under the brand names of CITRIX®, PC ANYWHERE® and MICROSOFT TERMINAL SERVICES™.

However, terminal emulations have several drawbacks. They do not distill the complexities of the software application for the remote, novice user 20, and they require bandwidth sufficient to render bitmapped displays of the local terminal.

Figure 3:
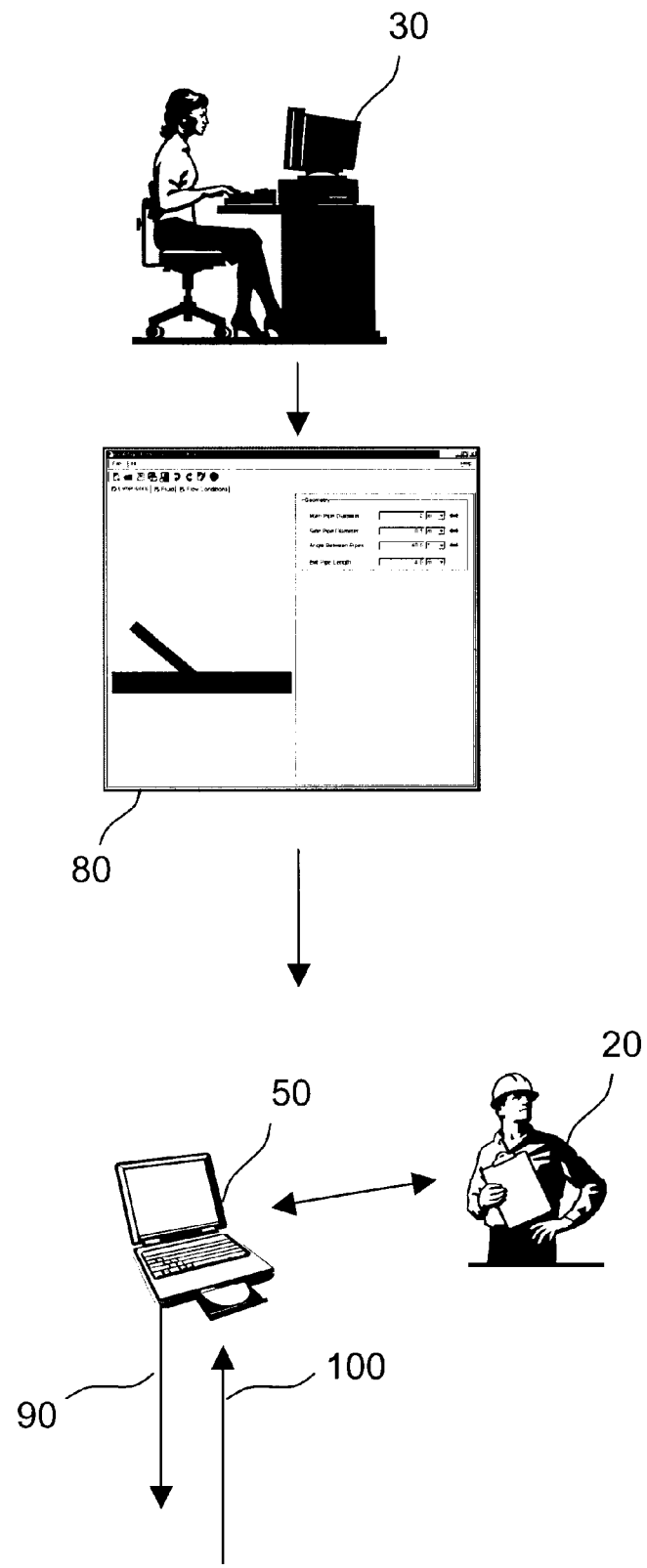
FIG. 3 is an illustration of the creation of a template file accessible by a remotely located novice user in communication with a computational server.

FIG. 3 illustrates the general concept of the instant invention wherein an expert user 30 generates a template file 80 that specifies a pre-configured engineering simulation of two pipes intersecting. The pipe diameters, angles and length may be adjusted by the novice user 20 without directly modifying the master configuration file of the pre-configured engineering simulation. The template file 80 is rendered on the client computer 50 as a graphic user interface. The novice user 20 may change the default values displayed in the graphic user interface and then directly transmit 90 the new values to the computational server 40. The results are then accessed 100 by the client computer 50 without any intervention by the expert user 30.

Figure 5:
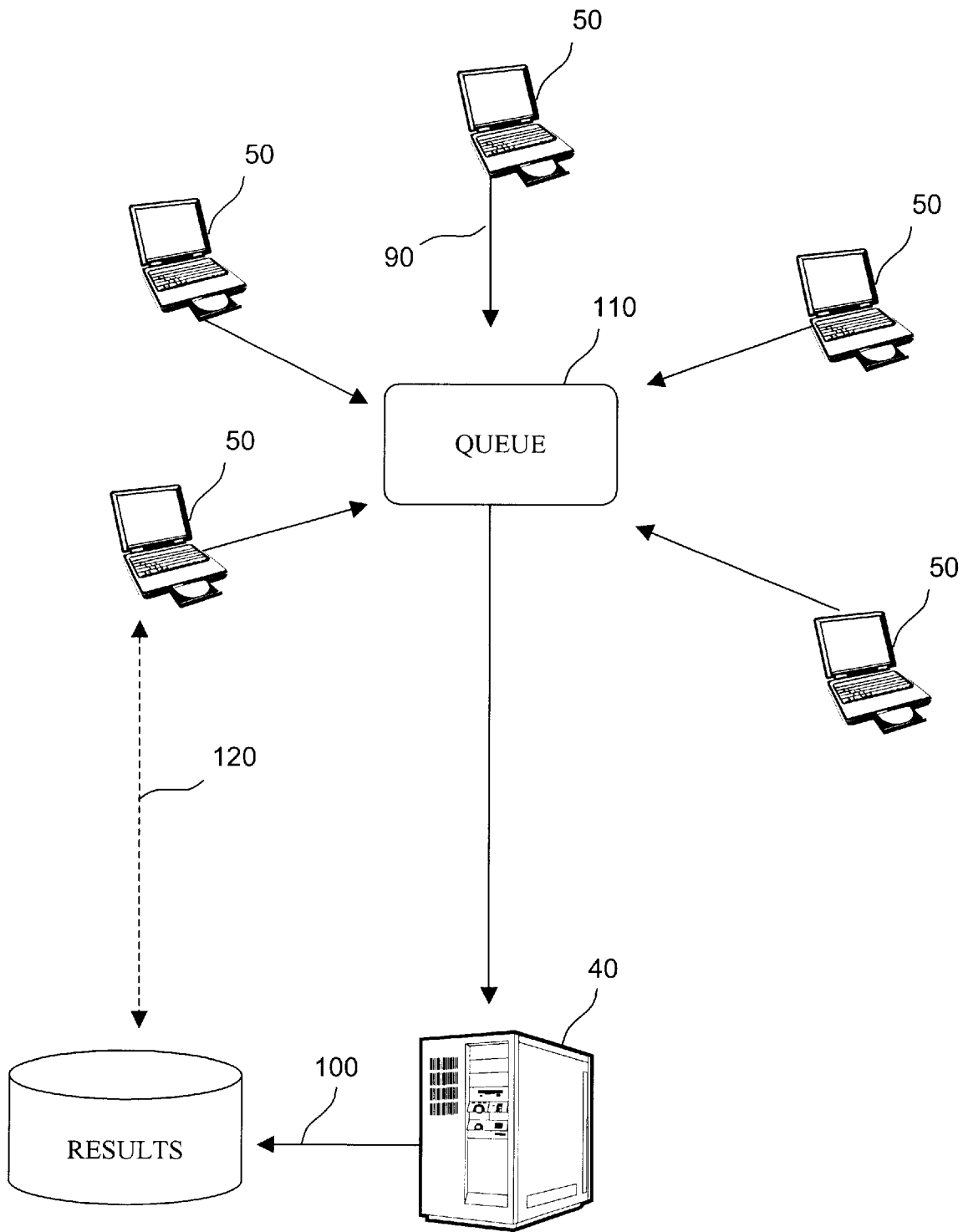
FIG. 5 is an illustration of a plurality of remotely located client computers sending requests for application execution to a queue which is then fed to a computational server.

FIG. 4 shows how a plurality of client computers 50 may transmit job requests by utilizing the template file 80 to the computation server 40 and subsequently receive back results 100. In order to effectively handle overlapping job requests, a queue 110 as shown in FIG. 5 may be established to hold job requests until the computational server 40 is available to process them. The computational server 40 may then send 100 the completed results to a storage means for later retrieval by the client computers 50.

Figure 6:
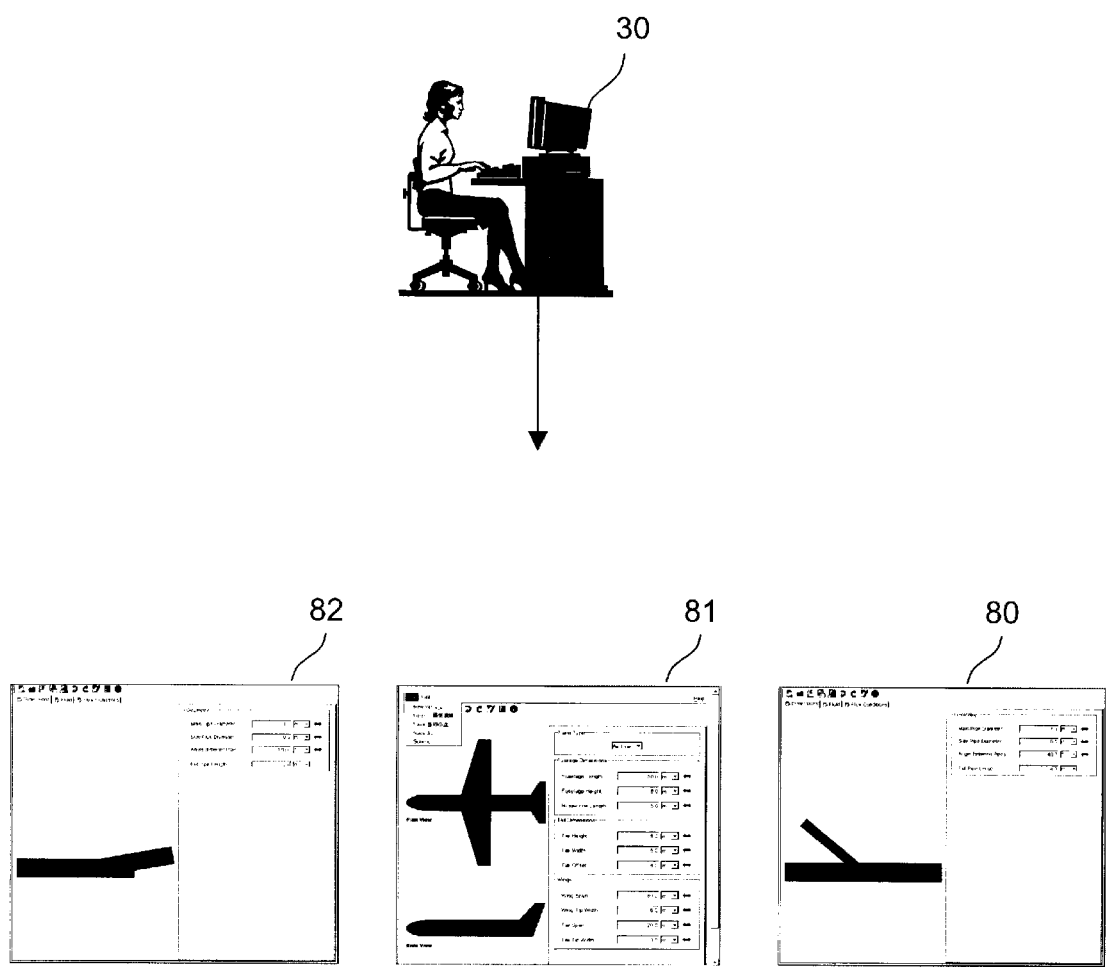
FIG. 6 is an illustration of the creation of a template library by an expert user.
Figure 7:
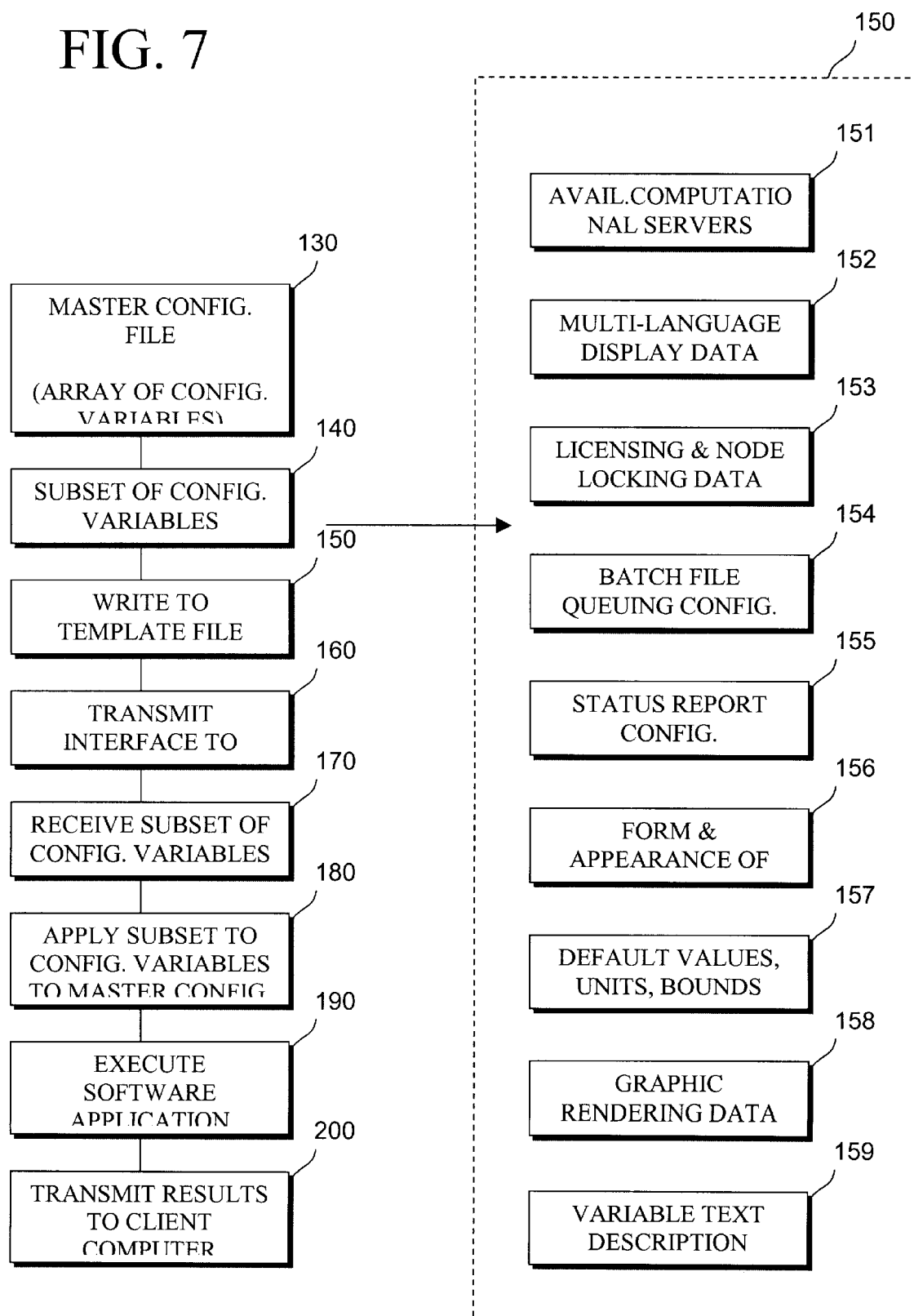
FIG. 7 is a flowchart diagram of the method of the invention.

As shown in FIG. 6, the expert user 30 may anticipate the various simulations or reports typically required on an ongoing basis and provide a library of template files 80–82 to accommodate client requests. FIG. 7 steps through the fundamental process of the invention wherein a master configuration file is accessed 130, the master configuration file having an array of configuration variables. The array is most typically correlated to a batch file in complex software applications. From the array of configuration variables, a subset of configuration variables is established 140. The subset is a parsed down set of configuration data subject to anticipated modification by the novice user 20. For example, a master configuration file might contain information on which computational servers are available for processing, which languages are available for display and the queuing information to determine the relative priority of one job over another. None of this information may be of interest or even understood by the novice user. The novice user may simply only want a certain financial report or a certain simulation run without regard to the low-level configuration settings.

Accordingly a template file is written 150 which may contain specifications for the available computational servers 151, multi-language display data 152, licensing and node locking data 153, batch file queuing configuration 154, status report configuration 155, interface form and appearance 156, default values, measurement units and bounds checking configuration 157, graphic rendering data 158 and variable text description strings 159. The template file also contains instruction for displaying the simplified user interface on the client computer 50.

Although any number of user interface schemes may be adopted such as Macromedia's FLASH®, standard HTML, or the like, it is preferred that JAVA® applets be utilized as they provide a platform independent, rich graphical interface.

The interface defined by the template is transmitted to the client computer. Input comprising the subset of configuration variables is received 170 by through the interface on the client and then returned for processing. The subset of configuration variables are applied 180 to the master configuration file and then the software application is executed 190 in accordance with the parameters of the master configuration file. The results are then transmitted 200 to the client computer.

Figure 8:
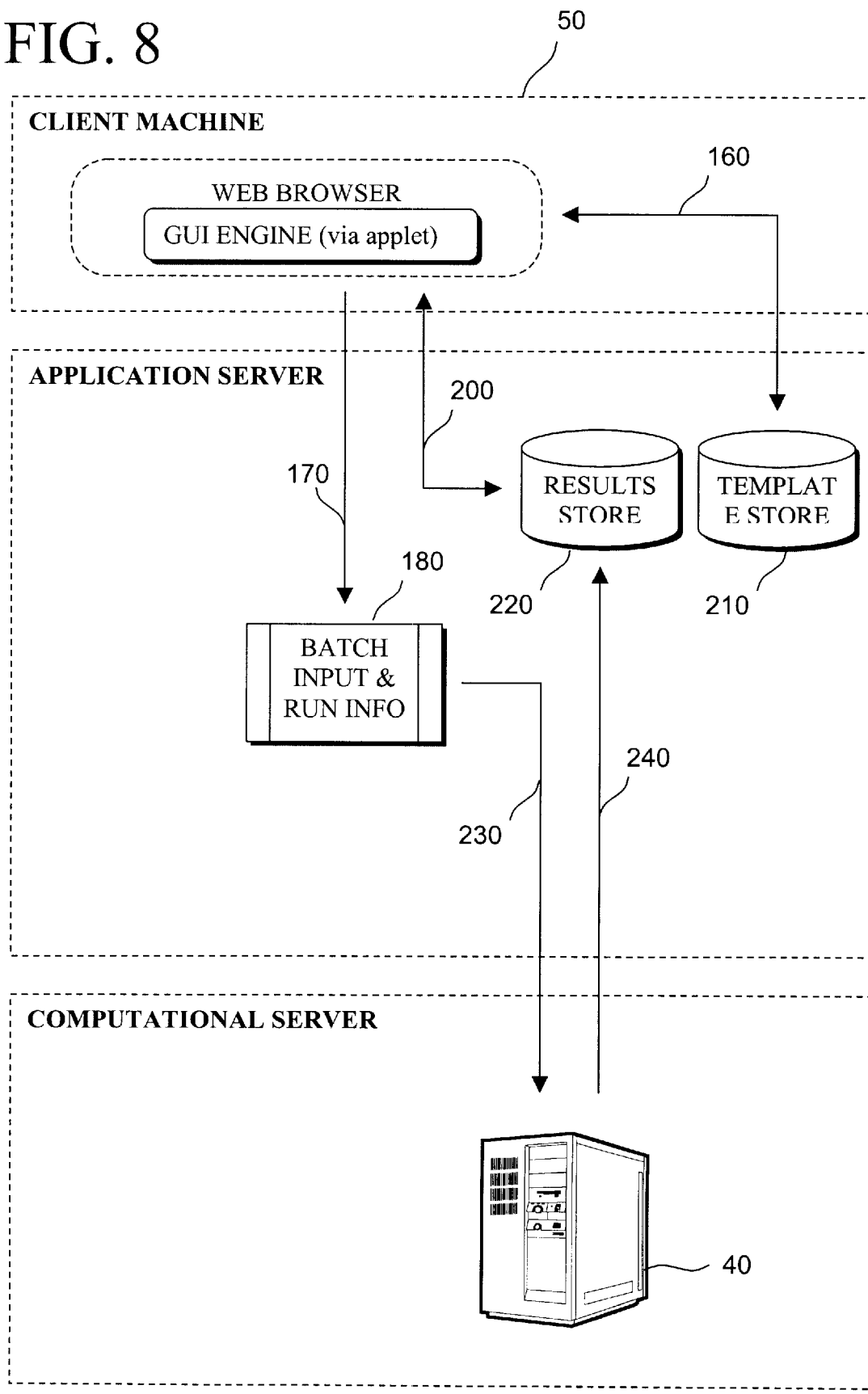
FIG. 8 is a diagrammatic view of a preferred embodiment of the invention.

FIG. 8 shows an exemplary architecture of the process including a client machine, application server and computational server. A template store 210 provides a library of preconfigured application available for modification and execution by the computational server 40. The library may include engineering simulations, financial reports or the like. The application server in a preferred embodiment of the invention is a web server which receives and transmits data according to the HTTP protocol. Processing of data on the application server may be handled by the common gateway interface standard, server-side scripts such as Microsoft's Active Server Page (ASP), Allaire's Cold Fusion Script, or preferably, JAVA® servlets which may be invoked as a thread in a single daemon process. The client machine preferably utilizes a web browser to render a JAVA-based user interface for modifying the subset of configuration variables and provide dynamic graphic feedback to the user. User input is then received 170 by the application server and applied to the master configuration file by parsing machine readable identifiers in the master configuration file and replacing them with user-defined values. The newly modified master configuration file is then transmitted 230 to the computational server 40 which then executes the application and returns 240 the results to a results store 220. The results store 220 may be an email server for immediate delivery of the results to the end user or may simply be a file directory accessible by the client computer via an FTP or HTTP request 200.

It should be noted that for the purposes of this disclosure, a client-server arrangement is the anticipated system architecture. However, it would be possible for the client to be a "dumb" terminal running an emulation application of a web browser application executed on a computer. Accordingly, the "dumb" terminal might be better classified as a "client terminal" rather than a "client computer" since the terminal is not "computing" anything. Alternatively, the client computer may be the same as the computational server wherein the end user might have both the complex user interface available providing all the expert detail available for the application, or the simplified user interface which shields the end user of the complexities of configuring and executing the software application. Indeed, even an expert user might prefer the accessibility and reusability of the simplified client interface for repetitive tasks and therefore might utilize the simplified client interface on the same computer that authors or executes the complex software application.

Figure 9:
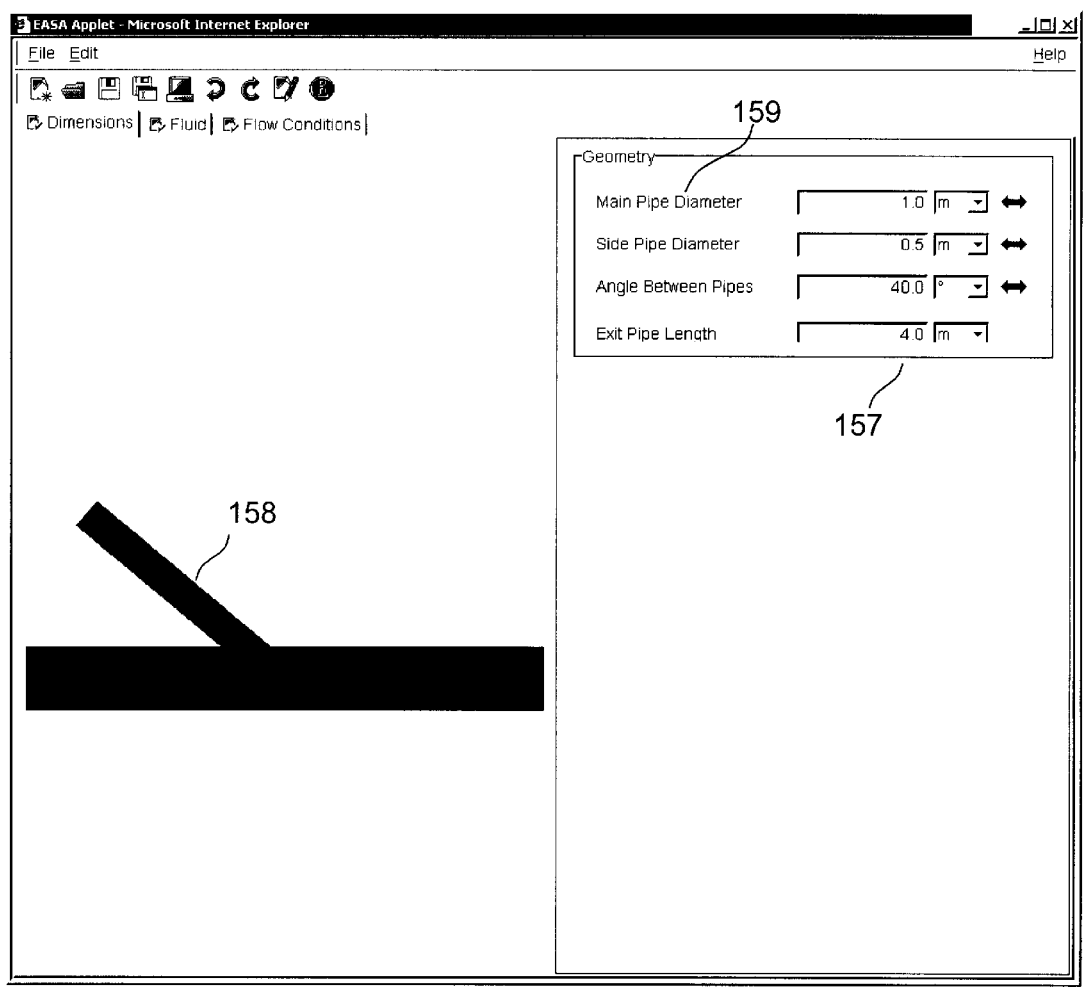
FIG. 9 is a screen shot illustration of an exemplary user interface according to the invention.
Figure 10:
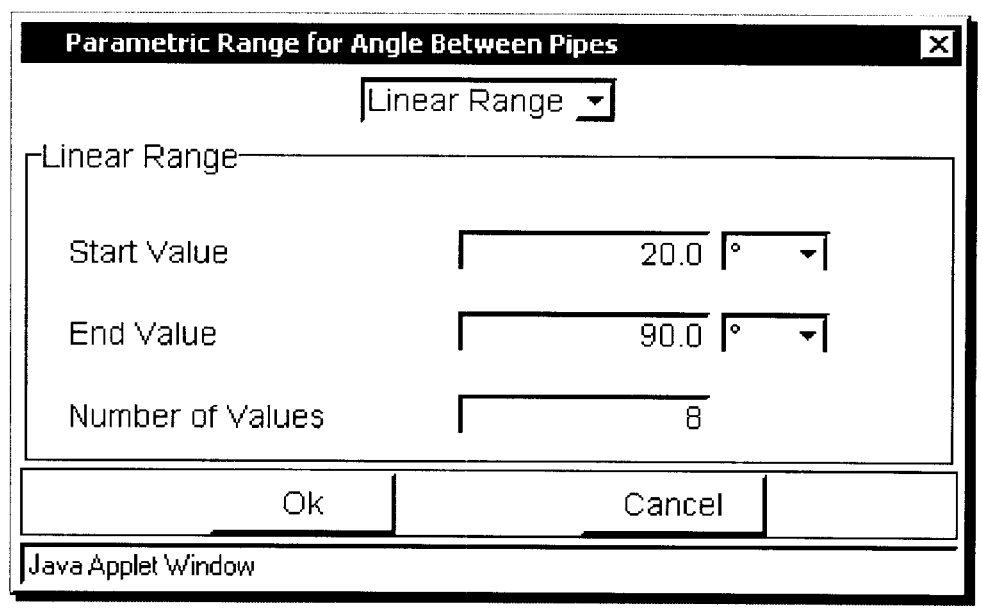
FIG. 10 is a dialog box illustration of a feature of the invention to accept a parametric range.

FIG. 9 is an illustration of an exemplary user interface that would be viewed by the novice user on a client computer. Graphic rendering data 158 is displayed on the left side of the application window. It can be seen that the geometry of the simulation consists of a main pipe diameter, a side pipe diameter, an angle between the two pipes and the existing pipe length. As specified in the template file, text description strings 159 are display on the user interface and default values 157 are provided in the form fields. It can also be seen that all length fields are defaulted to a meter ("m") measure unit. However, the meter may be changed to other units populated in the drop down combo box to the right of each form field. The angle between the two pipes is represented by degrees as denoted by the "°" symbol. Responsive to clicking the double-arrows to the right of the first three variables, the dialog box of FIG. 10 appears. In FIG. 10, a parametric range for the angle between the two pipes may be specified. In the example, the start value is 20 degrees with an end value of 90 degrees with eight steps.

Figure 11:
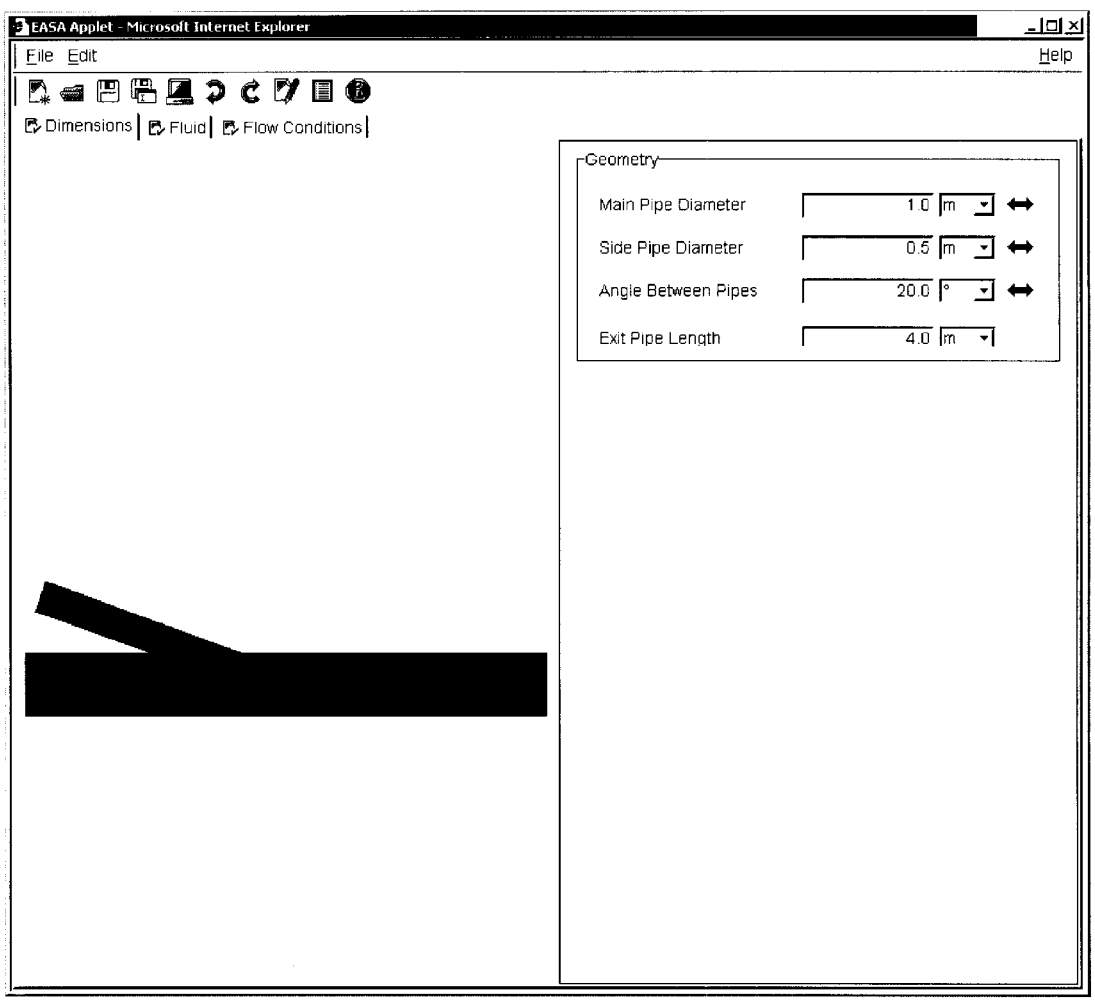
FIG. 11 is a screen shot illustration of an exemplary user interface showing a change in graphic representation responsive to a change in numeric input into a form.
Figure 12:
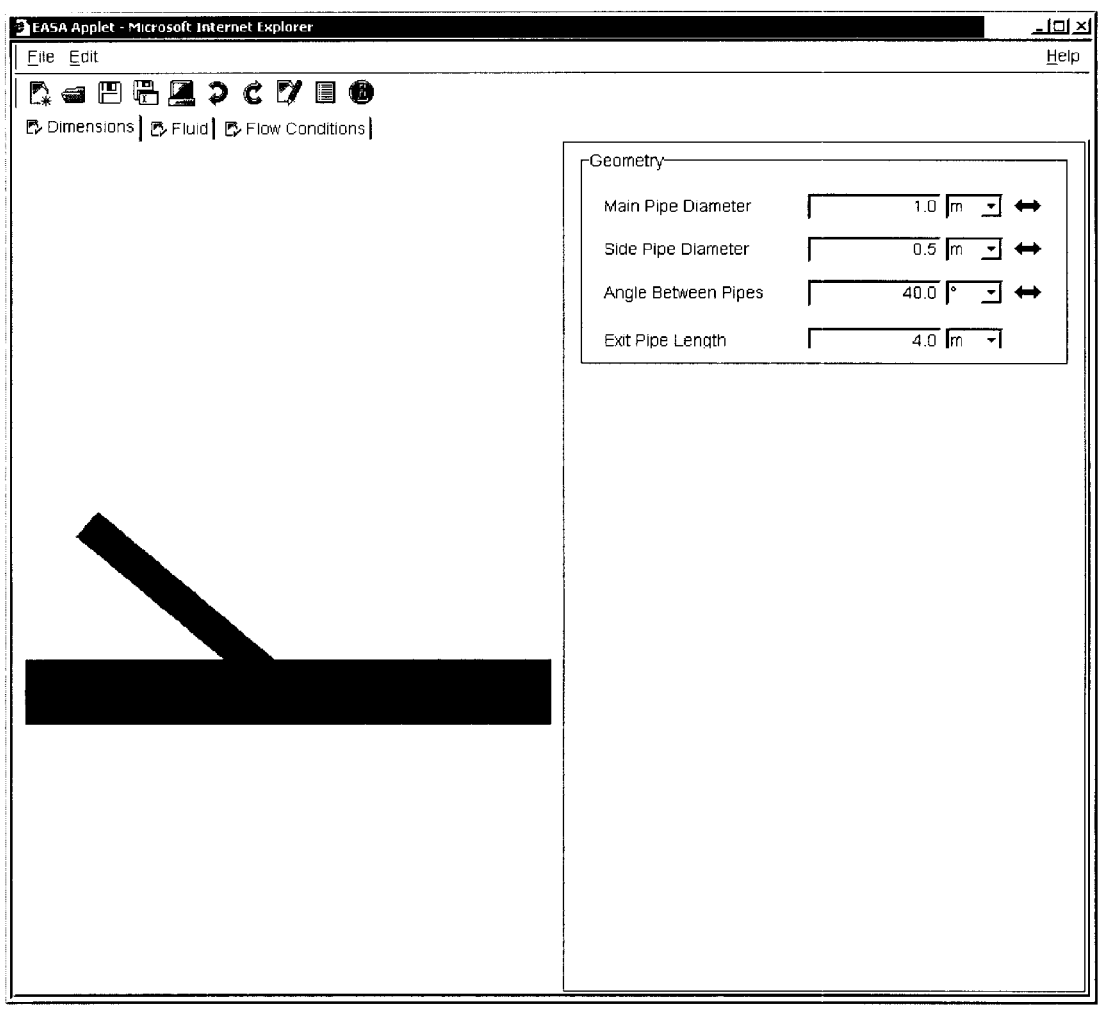
FIG. 12 is a screen shot illustration of an exemplary user interface showing a change in graphic representation responsive to a change in numeric input into a form.
Figure 13:
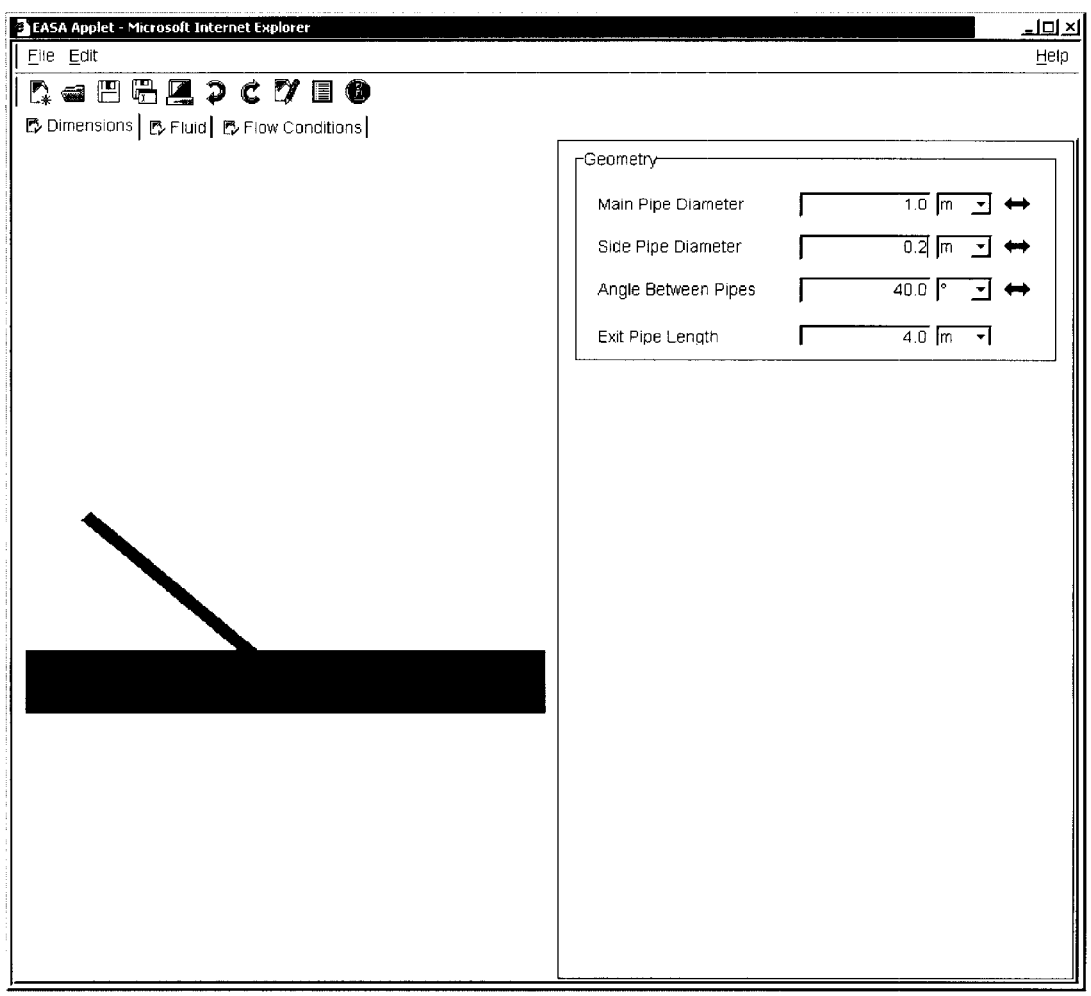
FIG. 13 is a screen shot illustration of an exemplary user interface showing a change in graphic representation responsive to a change in numeric input into a form.
Figure 14:
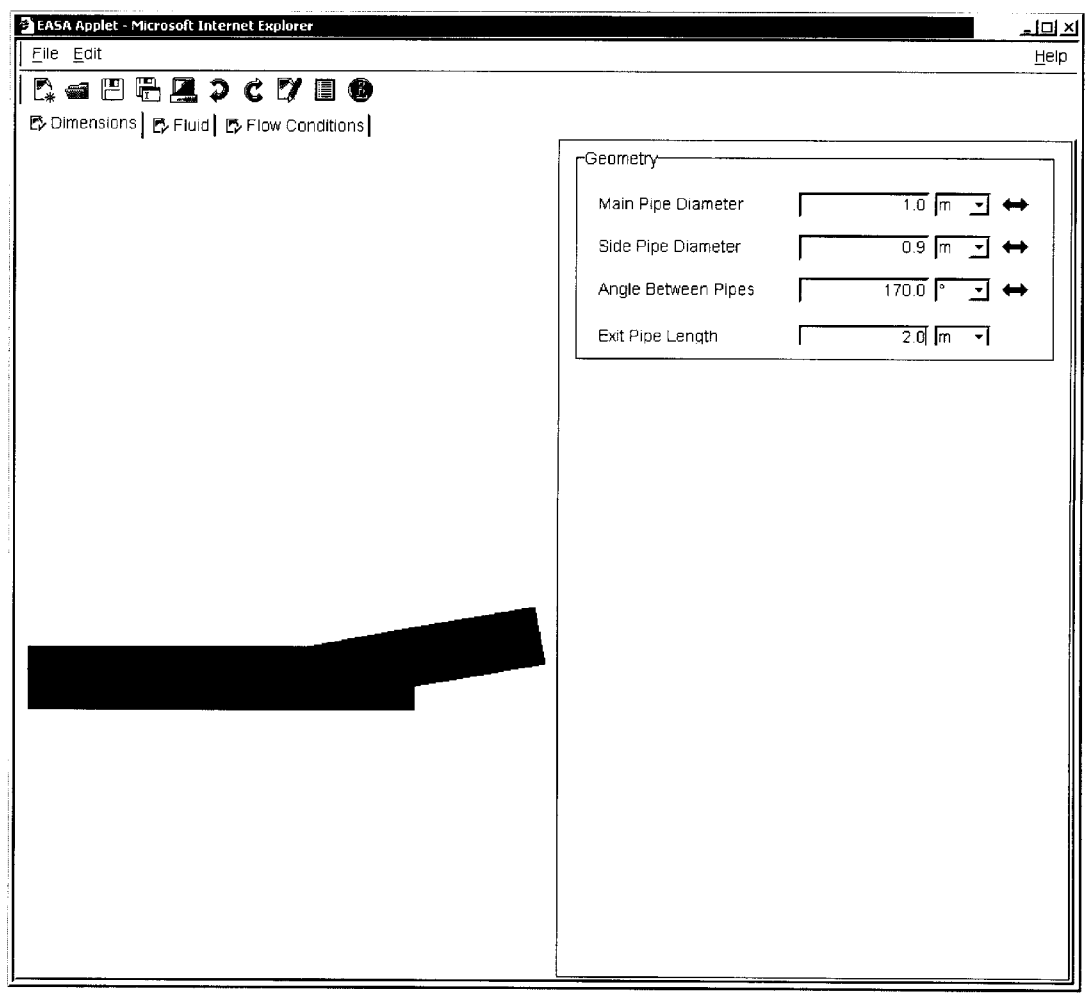
FIG. 14 is a screen shot illustration of an exemplary user interface showing a change in graphic representation responsive to a change in numeric input into a form.

It can be seen in FIG. 11 that the graphic representation is dynamically responsive to the modification of the variables in the forms. For example, it can be clearly seen that the angle between the two pipes in FIG. 9 and the angle in FIG. 11 are substantially different solely based on the graphic representation. In FIG. 12, the dimensions are brought back to the original values in FIG. 9. In FIG. 13, the side pipe diameter is reduced. In FIG. 14, the side pipe diameter is increased, the angle between the pipes is increased and the exit pipe length is decreased.

It should be noted that graphic representations may take several forms or alternatively be absent in some applications. The type of the graphic representations may include 2D or 3D imaging, processed on the client or server side.

Figure 15:
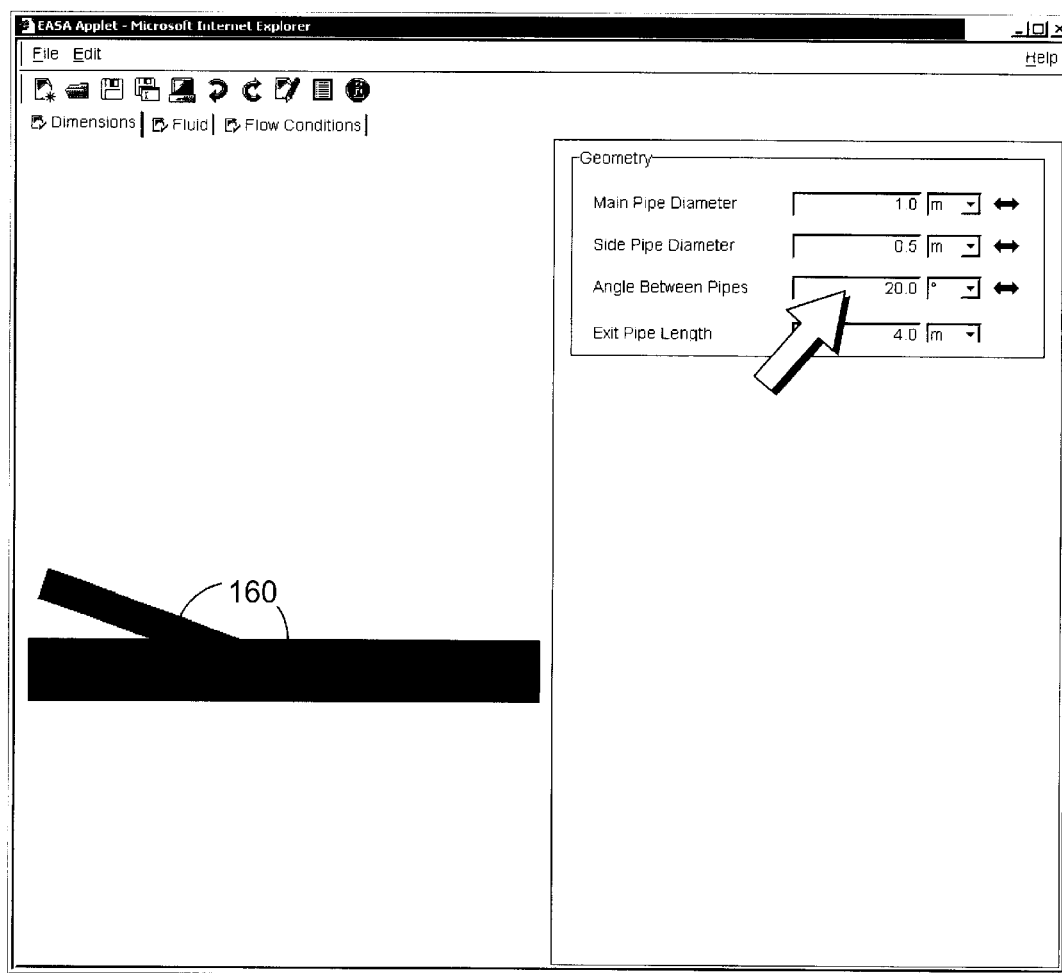
FIG. 15 is a screen shot illustration of an exemplary user interface showing the display of a dimension value response to a change in number input into a form.
Figure 16:
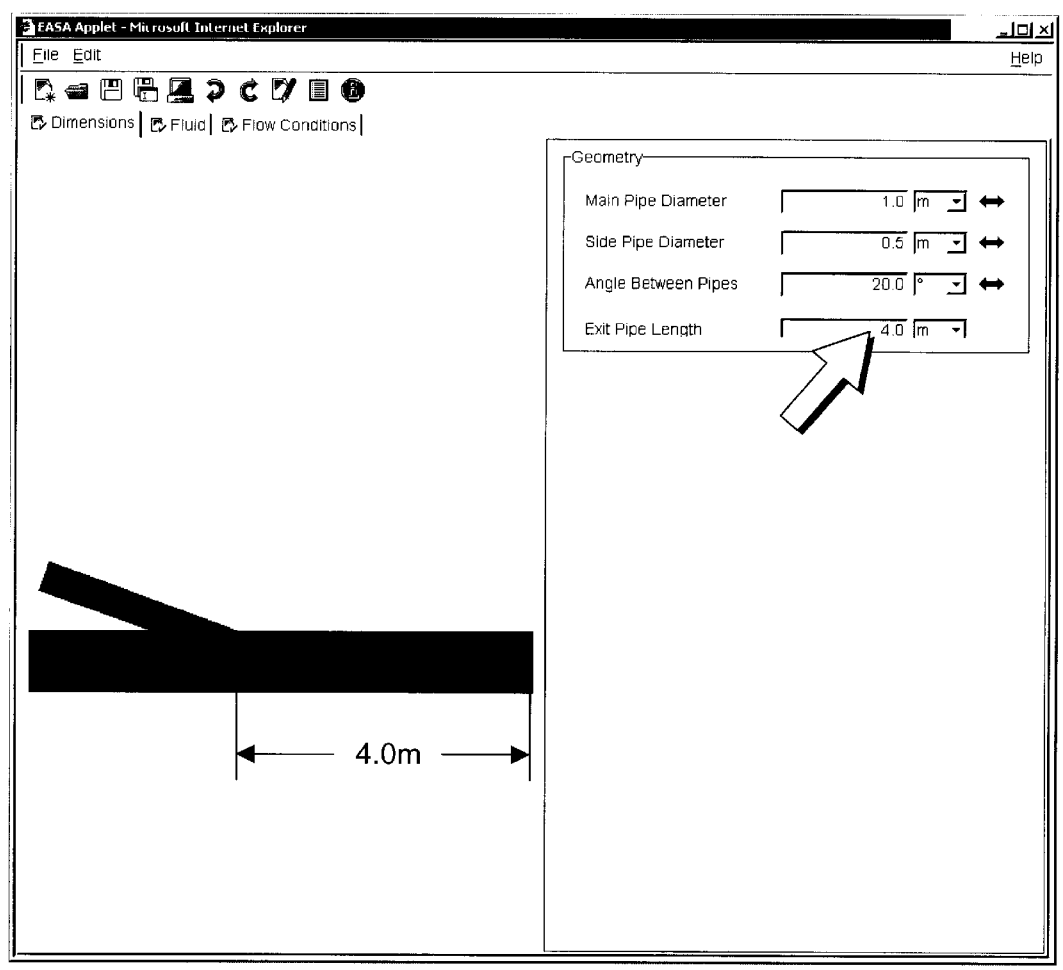
FIG. 16 is a screen shot illustration of an exemplary user interface showing the display of a dimension value response to a change in number input into a form.

FIG. 15 illustrates a feature of the invention wherein responsive to mouse movement, keyboard entry or other preselected event, the angle between the two pipes is displayed in visual proximity to the appropriate graphic representation. In FIG. 16, movement of the mouse cursor fires an event to make the previous angle value invisible and display the existing pipe length on the graphic representation. In alternative embodiments, all dimension information may be displayed simultaneously or made invisible collectively.

Figure 17:
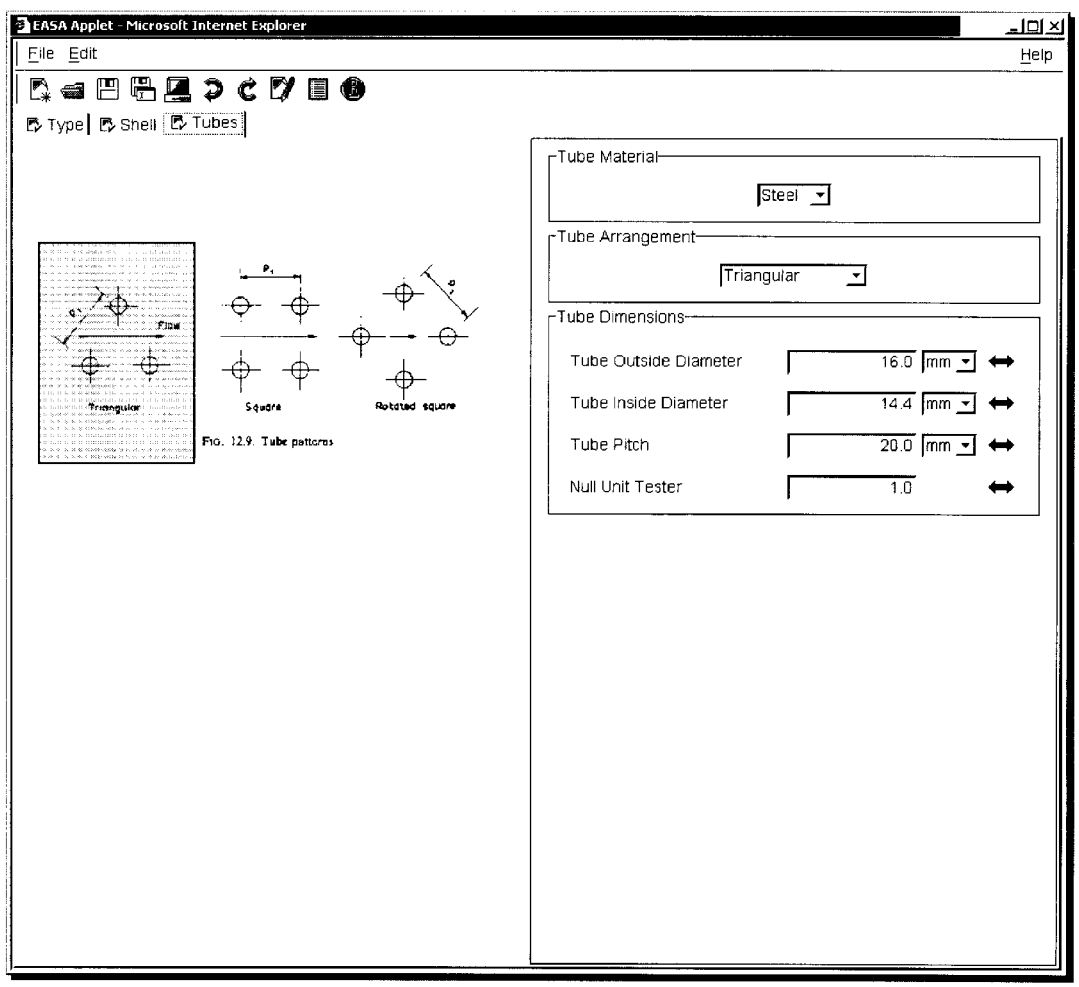
FIG. 17 is a screen shot illustration of an exemplary user interface showing the image selection of a triangular arrangement of tubes.
Figure 18:
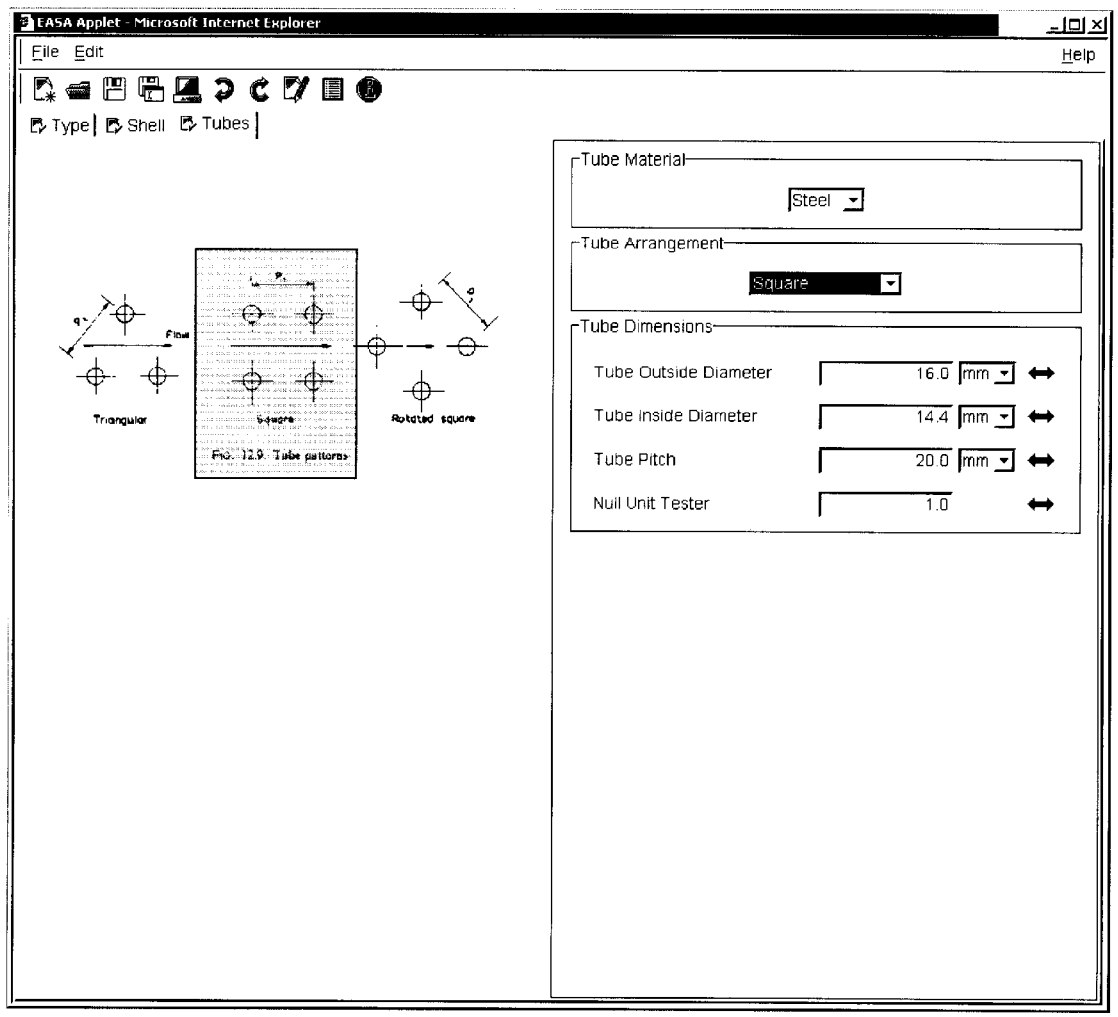
FIG. 18 is a screen shot illustration of an exemplary user interface showing the image selection of a square arrangement of tubes.

FIG. 17 illustrates the integration of selectable bitmap images in the user interface wherein the value of a form field variable is modified responsive to the selection of a corresponding image. For example, the tube arrangement for the illustrative simulation may be triangular, square or rotated square. Responsive to the selection of the triangular image, the drop down combo box on the right side of the user interface is updated to reflect the triangular value. In FIG. 18, the selection of the square arrangement image updates the drop down combo box to the square value. In similar fashion, an image may be highlighted, inverted or otherwise visually noted responsive to the direct selection of a value within the drop down combo box.

Figure 19:
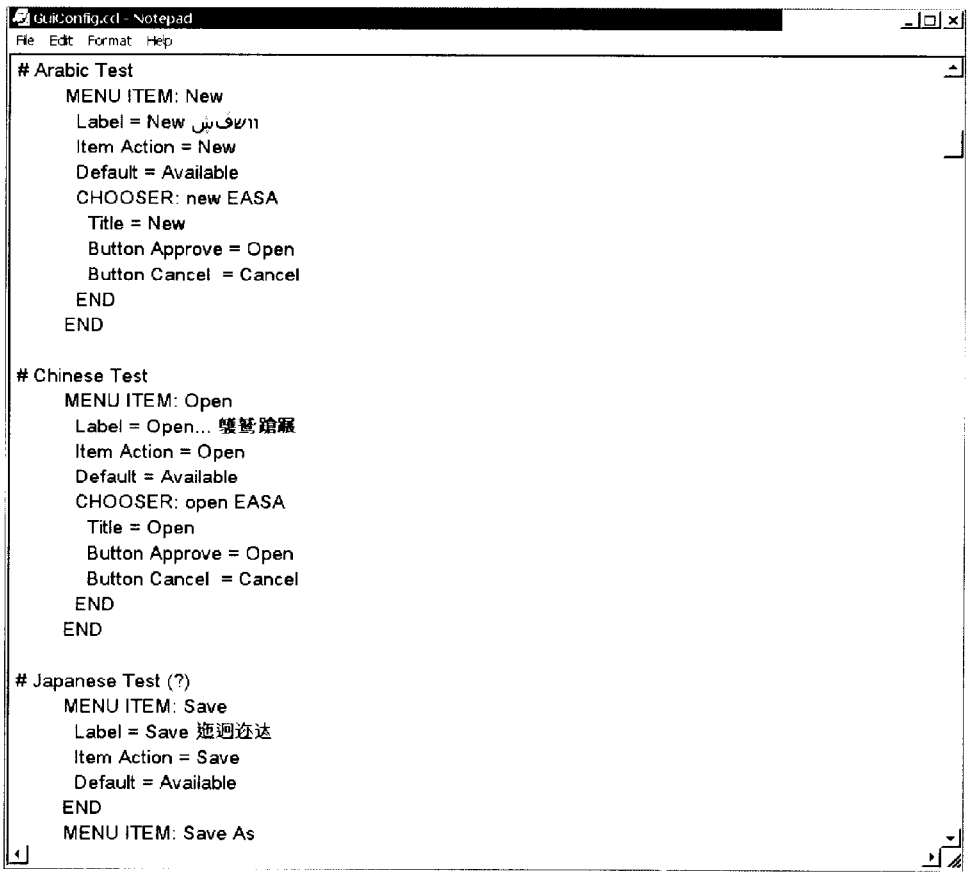
FIG. 19 is a screen shot illustration of a text configuration file illustrating multi-language support for the text string description for menu items displayed in the user interface.
Figure 20:
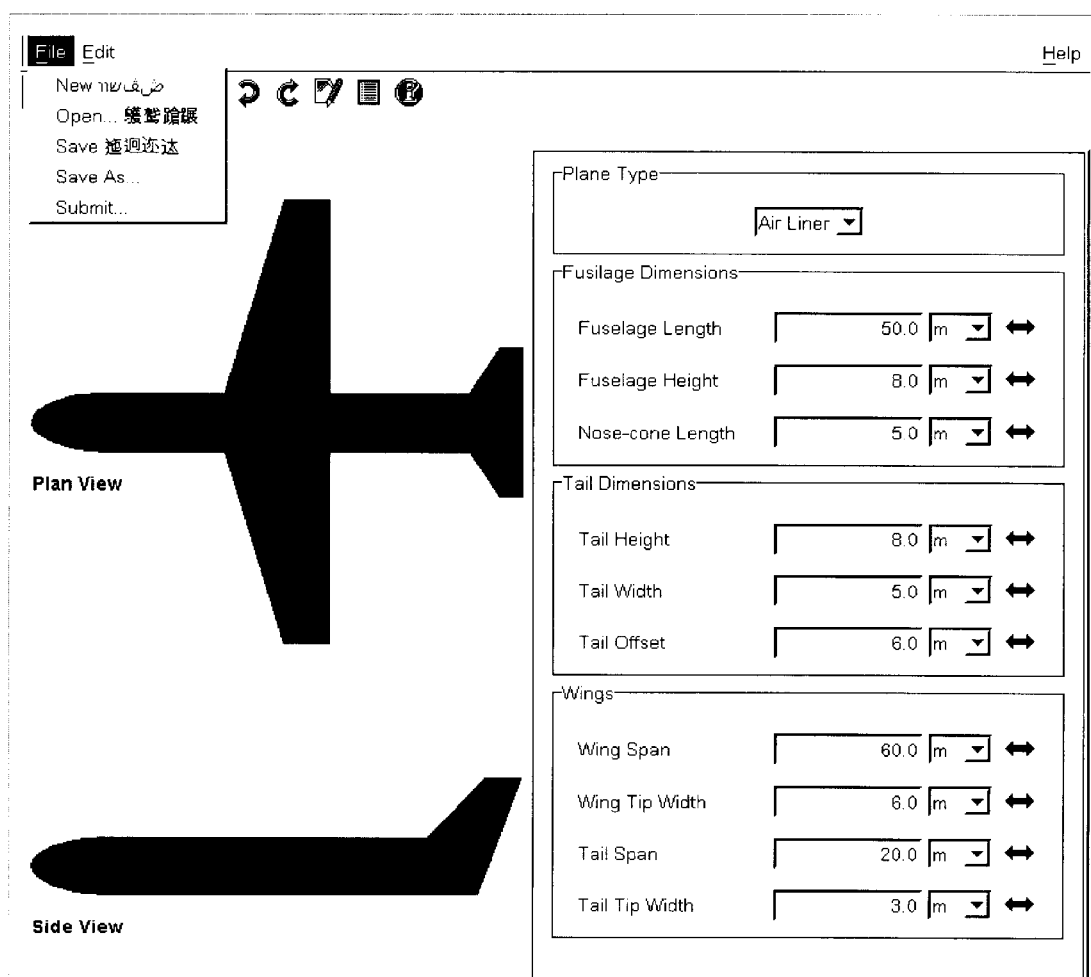
FIG. 20 is a screen shot showing the multi-language display of menu items according to the configuration settings of FIG. 19.

FIG. 19 shows a graphic user interface configuration file providing multi-language alternative text for menu items within the user interface. FIG. 20 illustrates the resultant drop down menu as viewed through the client interface.

FIG. 21 shows an expression editor dialog box which may be used to define the value of one variable responsive to the modification of one or more other variables. For example, the side pipe diameter could be set to half the main pipe diameter by using the expression 0.5*D1.

Figure 22:
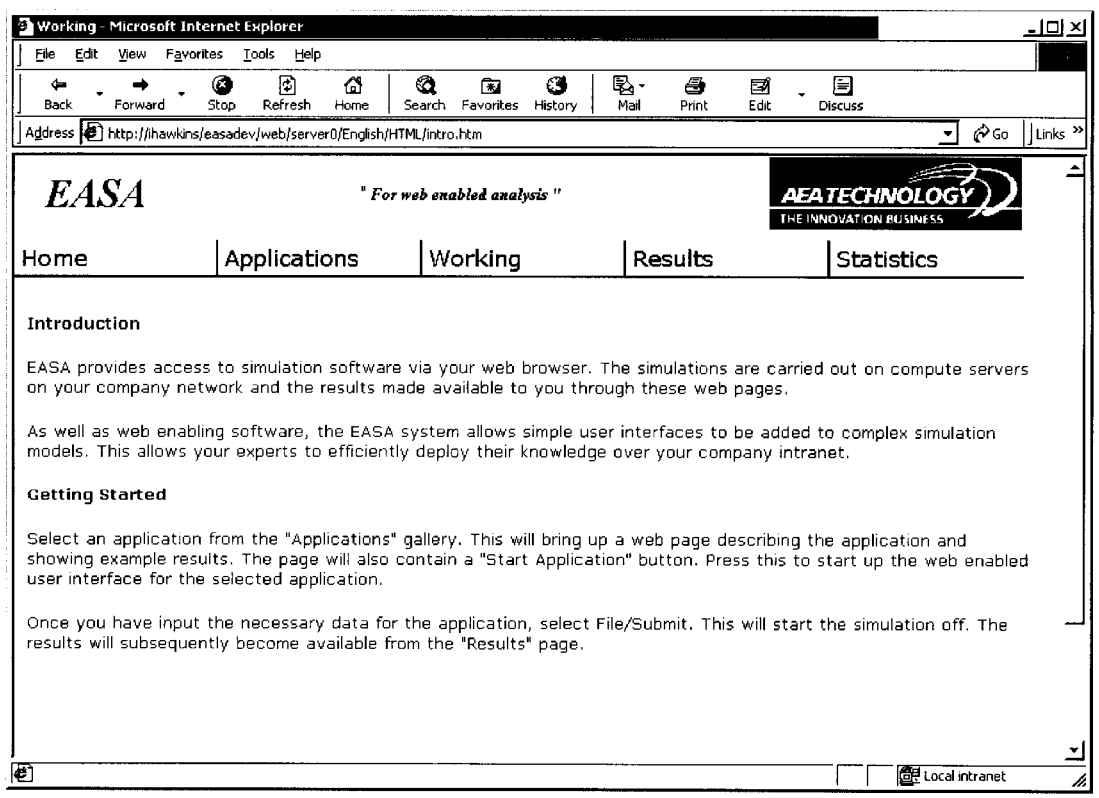
FIG. 22 is a screen shot illustration of a web page interface for remotely accessing a complex software application.
Figure 23:
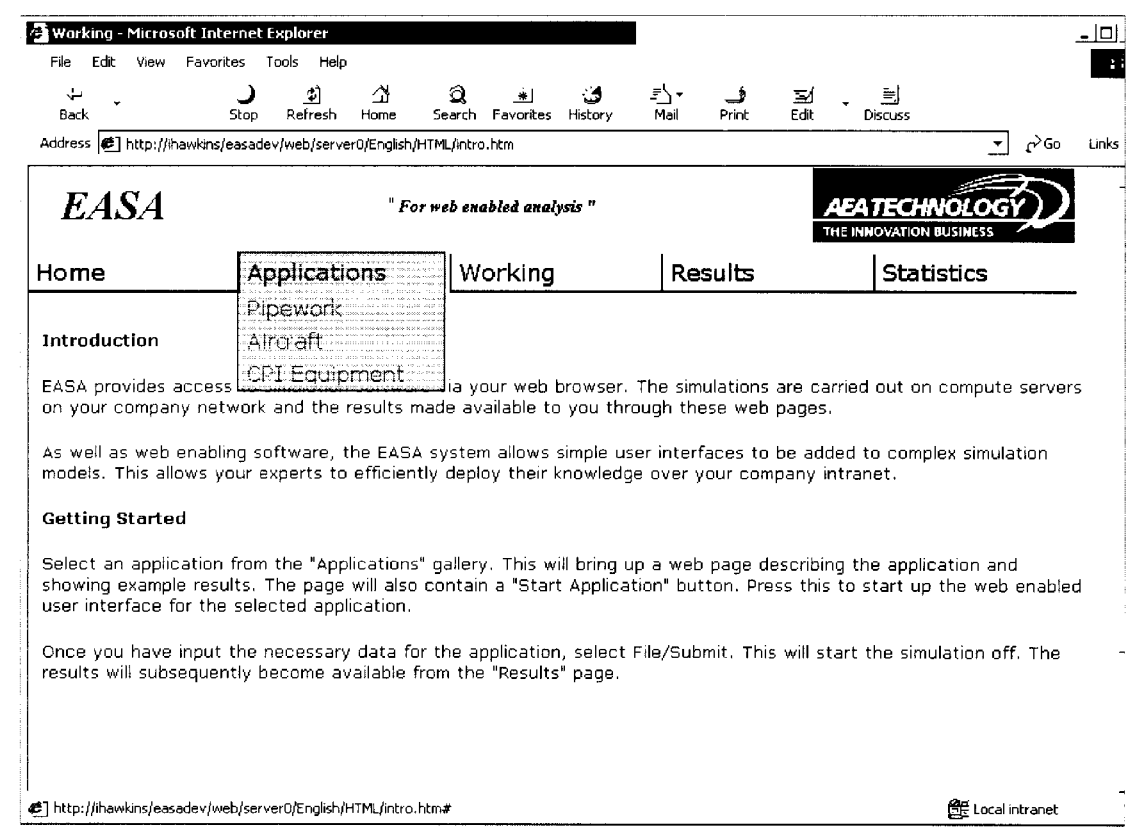
Figure 24:
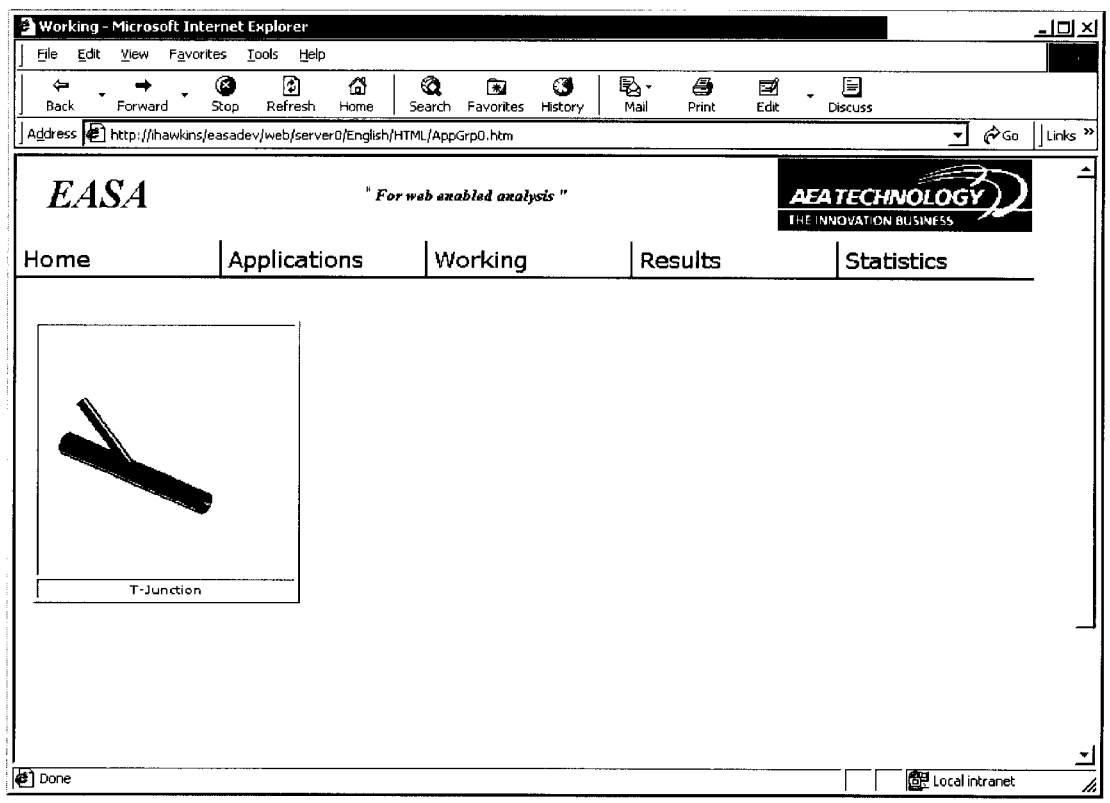
FIG. 24 is a screen shot illustration of an available simulation for which FIGS. 11–16 showed some of the variables available for modification.
Figure 25:
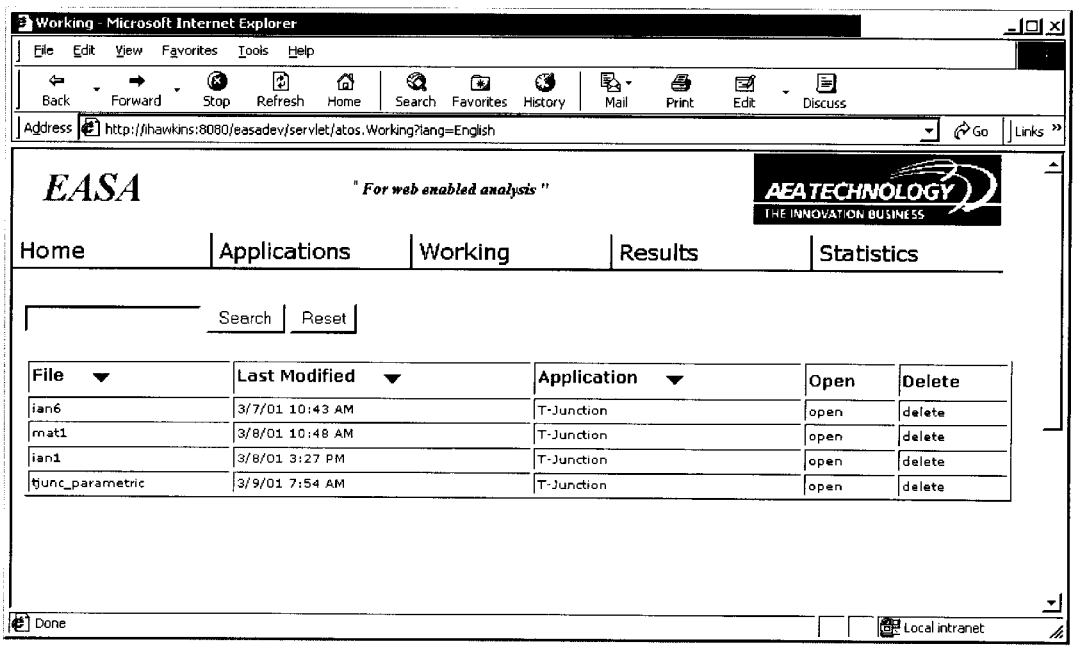
FIG. 25 is a screen shot illustration of saved, client side configurations.

FIG. 22 shows the user interface for selecting an application made available through a set of web pages, either on an intranet or internet site. In FIG. 23, a range of applications is provided including pipework, aircraft and CPI equipment. In FIG. 24, a single application for a T-Junction simulation is provided and is selectable responsive to a mouse click. The user interface is then displayed in the client computer and the user enters the data on each tabbed pane until he or she has set all the configuration variables for the simulation of interest. At any point he or she may save the work to disk or restart from a saved file as shown in FIG. 25.

Figure 27:
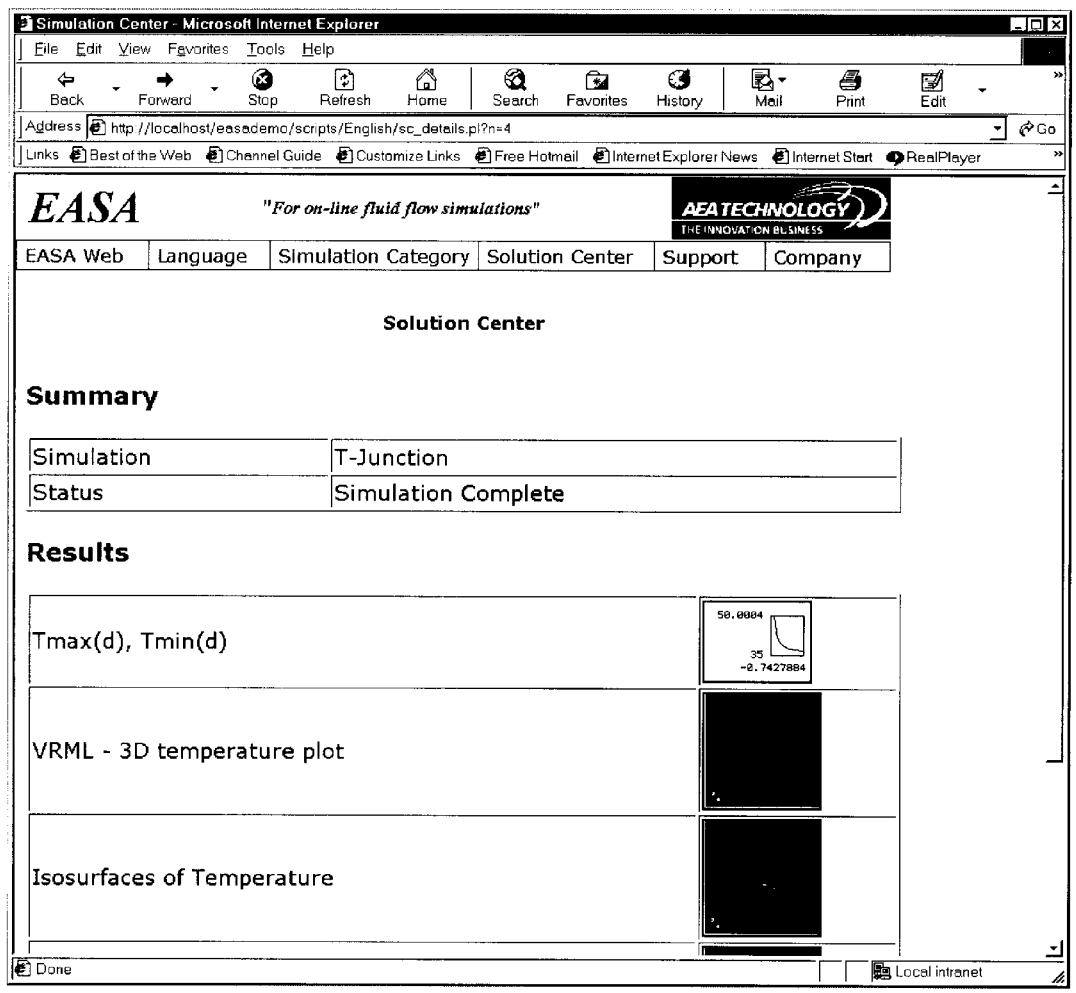
FIG. 27 is a screen shot illustration of the results as view by the client interface.
Figure 28:
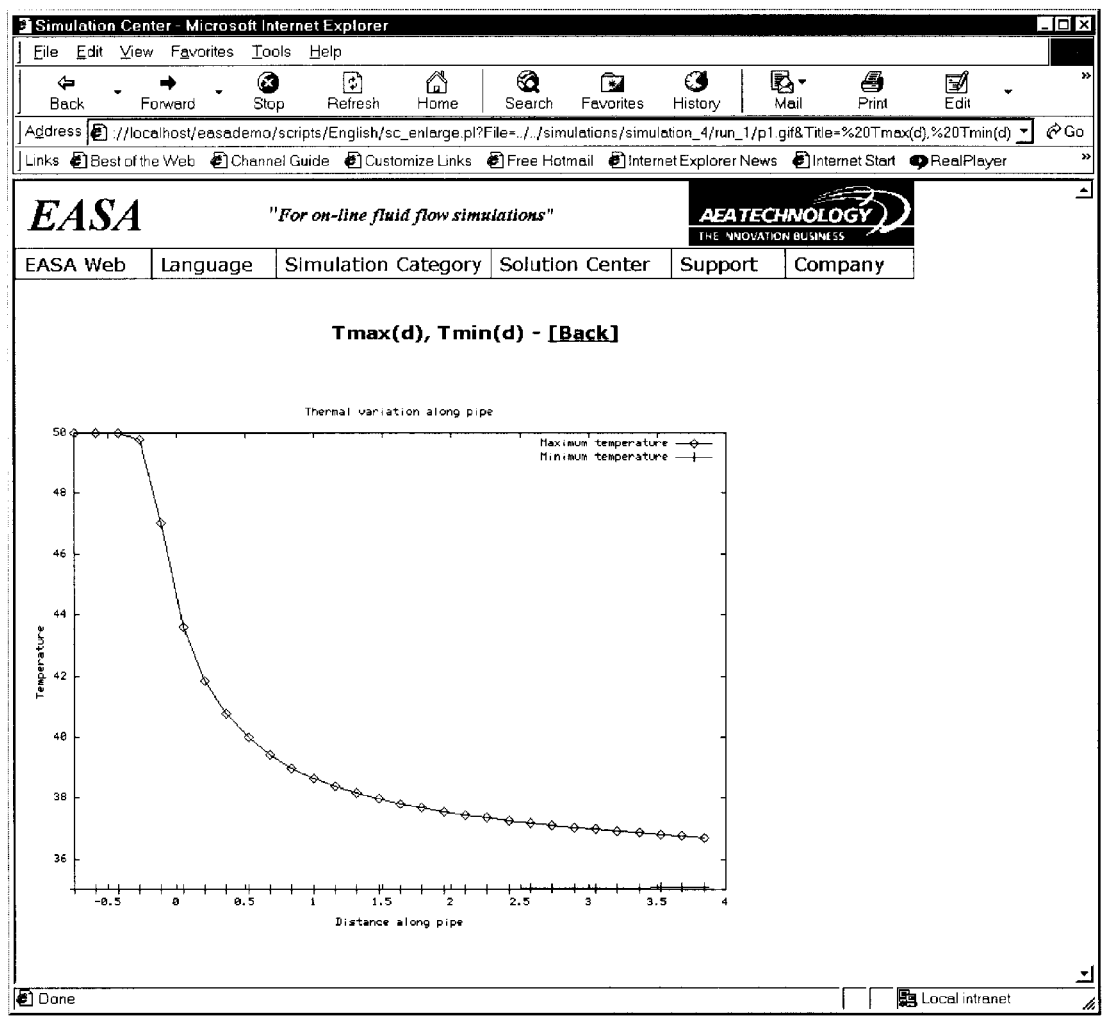
FIG. 28 is a screen shot illustration of an individual results graph.

Submitted simulations listed in FIG. 26 may be viewed under the results section of the web pages. In this example, results are stored on the server so that the information can be easily shared across a company intranet. However, results may also be downloadable to the end user over either HTTP or FTP. As shown in FIGS. 27 and 28, in addition to static images, VRML can also be used to display 3D images.

The remaining FIGS. 29–64 and 66–73 represent an exemplary script-based language for enabling the invention on virtually any batch file-driven software application. It should be noted that the invention might also be applied to software applications that are not driven by batch files. This may be achieved by the use of server software that emulate a specific screen configuration. The emulation need only take place on the server, not the client, thereby avoiding the drawbacks of bandwidth and user complexity. In addition, software developers that produce applications that appear strictly as a GUI to the end user may nonetheless link in code to their GUI's so that batch files can reference GUI objects by name via a text file. This is a well-known process in which automated GUI testing is achieved.

In the scripts that are associated with this discussion, EASA™ references a brand name application from AEA that incorporates the features of the present invention. EASAp™ is a brand name designation for an individual template file compatible with the EASA™ technology. CFX® is a registered trademark for simulation software developed and distributed by AEA.

Administrative tasks for implementing an EASA™ application start with the creation of several configuration files which will typically be created during installation and are unlikely to require frequent changes. The server configuration file as shown in FIG. 29 allows for the specification of multiple servers to allow for redundancy if a server is down. FIG. 30 illustrates a language configuration file to indicate the languages to be display to the end user. It is preferred that the system supports the full range of characters sets via UTF-16.

The software configuration file of FIG. 31 defines the application software to be made available to the EASA™ applications. This includes specifications of the licensing requirements, scripts to monitoring run progress and scripts to check for license availability. References to computational servers can also be added to cope with node locked licensing.

The computational server configuration file of FIG. 32 allows an administrator to specify which machines to run EASA™ simulations on. This file makes the EASA™ package easily adaptable to a customer's local computing environment. For example job submission can be funneled through their own existing batch submission software such as LSF and files can be transferred using FTP, RCP or other known transfer methods. The queue configuration file of FIG. 33 allows the administrator to customize the queuing of EASA™ simulations onto computational servers.

The creation of an EASA™ user interface may be done by creation of an ASCII GuiConfig file. The creation process may be done through direct editing of the file. However, in a preferred embodiment of the invention, a GUI tool is employed to enable authors to create such files more rapidly. The tool has similarities to a GUI web page generator such as Microsoft's FrontPage® or Macromedia's DreamWeaver® products, though the GUI it would create would be much richer as it is not restricted to creating HTML. In a preferred embodiment of the invention, the GuiConfig file is created in a secure binary format which is unreadable by simple text editors.

To add a data entry box which allows the user to enter a real number, the text of FIG. 34 is added to the GUI configuration file. FIG. 35 employs data checking which can be added through addition of a bounds line. Bounds checking can be made relative to other data by using the name of the REALBOX. In the example of FIG. 36, the side pipe diameter cannot be made larger than the main pipe diameter. Adding a Range Method as shown in FIG. 37 can set parameter ranges.

Graphical feedback is important, as it helps users to see that their input data is as intended. Diagrams can be added through the data file, which automatically redraw following user input. The illustrations of FIGS. 11–14 were drawn by the code as shown in FIG. 38, where D1, D2, L and A are the names of the REALBOXES in the datafile wherein the user sets the pipe diameters, exit lengths and angle of intersection.

To make a new EASA™ available to end-users, the author creates a new subdirectory under an EASA™ applications directory, a GuiConfig.ccl and any template files are put in this directory and then an update script is run. This regenerates all the web pages so that the new application becomes available to end-users. The GUI is associated with the underlying software through the template section of the GuiConfig file. The code in FIG. 39 indicates that three pieces of software are to be run in succession when the user selects "Submit" in the application.

The mapping to individual variables in the template files is done as shown in FIG. 40. First a symbol in the template file is associated with information in the GUI via the "Replace" line. (The "value" is the value set by the user in the GUI). FIG. 41 shows the line of stress analysis input prior and subsequent to modification.

Each EASA™ GUI is defined through a CCL file. The file is used to automatically generate the EASA user interface and also defines how the user data entered in the user interface is used to modify template input files, which then feed into the underlying software application, for example standard CFX® software. The objective of the present invention is to be able to create, deploy and maintain EASA™ applications at very low cost and without EASA™ authors requiring programming expertise.

When creating a data driven user interface, there is trade off between creating enough flexibility in the GUI design and cost and complexity of implementation. A preferred embodiment of the invention implements the following user interface features: (1) data entry of reals/integers/strings/ logicals; (2) create/edit/delete functionality for named items which may contain any other data entry controls, (ex:

when adding one or more impellers to a mixing tank); (3) choice lists; (4) conditional display of data; and (5) grouping of user interface items and association with a diagram or image.

EASA™ applications are intended to work with the reliability of a spreadsheet. This means that comerror handling is essential. Typical errors will involve relationships between data entered by the user such as D1<0.5*D2.

The purpose of presenting graphic representations in the user interface is to help users under the data they are setting. In order to draw diagrams effectively it is necessary to incorporate grouping of graphic primitives.

Turning now to FIG. 42, "Easa ID" is a unique global identifier for a given EASA™ applications. The release number is used to help support backward compatibility. Width and height allows customization of window size for a target customer base. "Look and Feel" can be used by a java GUI engine to emulate a variety of window manager styles. Two titles are stored; the short title will appear in tables in web pages, with the long title as the tool tip. Selection image is used in construction of the application gallery web page. The menubar specification of FIG. 43 makes multi-language support easier. FIG. 44 provides for a toolbar button for opening a new EASA™ application.

The main advantage of adding units to CCL as shown in FIG. 45 is that it allows the author to add custom units and also to make the unit strings in the GUI language specific. The tabbed pane list of FIG. 46 is a named object that contains a set of tabbed panes. These panes may be shown one at a time with an image or diagram being simultaneously displayed. The panes may be visited in any order.

The sub pane object of FIG. 47 is used to group a set of related data entry items within a tabbed pane. FIG. 48 provides a READBOX object used for inputting string, real or integer data. Clearly if the type is integer or string, the units parameter is not needed and the default takes just a single string. FIG. 49 provides a named object used for defining a logical.

References provided by FIG. 50 are needed in the dynamic diagramming and in the error checking in order to refer back to a specified piece of data. Within the CCL file it is preferred to define a reference to a value to be the name of the parent object. One implication of this is that object names must be unique. The choice list object of FIG. 51 may be part of a tabbed pane or sub pane and allows selecfrom a static list of choices. Other data entry boxes can be displayed dependent on this choice via a conditional display parameter. The selector object of FIG. 52 may be part of a tabbed pane or sub pane and allows the creation, modificaor deletion of named groups of data. An example of usage would be in adding an arbitrary number of impellers within a mixing vessel.

In order to set defaults when an EASA™ user creates a new instance of a selector the selector default object of FIG. 53 is employed. The CCL to store the users data is provided by FIG. 54 and set via the GUI.

Dynamic diagrams are 2D sketches of the geometry of interest, which change shape as the user changes the input data in the GUI. A diagram may be associated with one or more tabbed panes, such that that diagram is shown while the user is entering data into the pane. A diagram is constructed from one or more graphic primitives that overlay each other in a specified order. Graphic primitives may be placed in groups, which may then be copied and moved within a view port. Each diagram is a child object of the diagram list object and examples are provided in FIG. 55.

The purpose behind introducing groups, is to reduce the time to create and debug complex diagrams. Groups enable geometry to be re-used and to be transformed to the correct location within the view port. An example is provided in FIG. 56.

Each EASA™ application is associated with one or more templates. The data from the GUI is subseused by the server to modify a copy of the template. Each template is associated with a single batch process. The template also contains sub-objects which control the clean up of files and the construcof the data to build the web pages as provided in FIG. 57. The clean up occurs after the template has been run. The delimiter character is by default %, but can be changed on a per template basis if desired. The purpose of specifying this character is to allow error checking on the temfiles. It should also be noted in FIG. 57 that a plurality of software application are executed in sequence. Alternatively, they might be executed concurrently by either multitasking or distributing the task to other CPUs. In FIG. 57, three executable applications are run: (1) CFX5BUILD; (2) CFX-SOLV and (3) CFXCUE. The applications may be a heterogeneous mix related only to the end objectives of the template author. For example, a template file might draw on both engineering and financial applications to provide both structural analysis and materials cost for an article of manufacture. Returning to FIG. 31, it can be seen that the single template file may also provide licensing information for a plurality of software applications.

Data set by the GUI is associated with the template file as provided by FIG. 58. The "Replace" parameter indicates the symbol in the template that will be replaced by the GUI value. The target parameter specifies the template in which the symbol is to be replaced. If a parameter is allowed to take multiple values as provided by the parametric study of FIG. 59, the range allowed parameter is set to "True." In order to provide flexibility, the layout of information in the detailed results pages from an EASA™ application is specified through the top level output object as shown in FIG. 60. The HTML object allows raw HTML to be added to the output. This may include sound files, applets etc. A results table creates a two column table from a collection of other child objects of output; the first containing titles and the second containing compact results such as thumbimages or numbers. The former is typically linked to expanded views of the results.

Upper and lower bounds may be specified as shown in FIG. 61 wherein pipe angles may not exceed 175 degrees nor be set below 15 degrees. Error messages associated with the immediate errors are stored under an "error list object" as shown in FIG. 62. There may be cases where it is desirable to carry out error checks prior to job submission that are not simple bounds on a given REALBOX. These are illustrated in FIG. 63. Error checking on repeated data arising from use of selectors adds additional complexity. If a warning or error check as described above refers to data repeated within a selector, the error needs to cycle through all the instances of that selector. (This requires either parsing of the expression to determine the parent objects of a given condition variable, or an additional parameter specifying the list of selectors associated with the condition.) All warnings and error checks should be repeated for each combination of parameters specas part of a parametric study. A further class of error checks involves checking data between different instances of a selector. For example, FIG. 64 provide sample code to ensure that two impellers do not overlap the same region of space. If the user has created 3 impellers the check is repeated 6 times, i.e for 1,2 1,3 2,3 2,1, 3,13,2. Note that internally the GUI engine will need to pre-parse the condition in order to convert it to valid expression syntax, i.e by removing the A__, B__prefix and adding a unique valid text prefix.

Figures 65, 66:
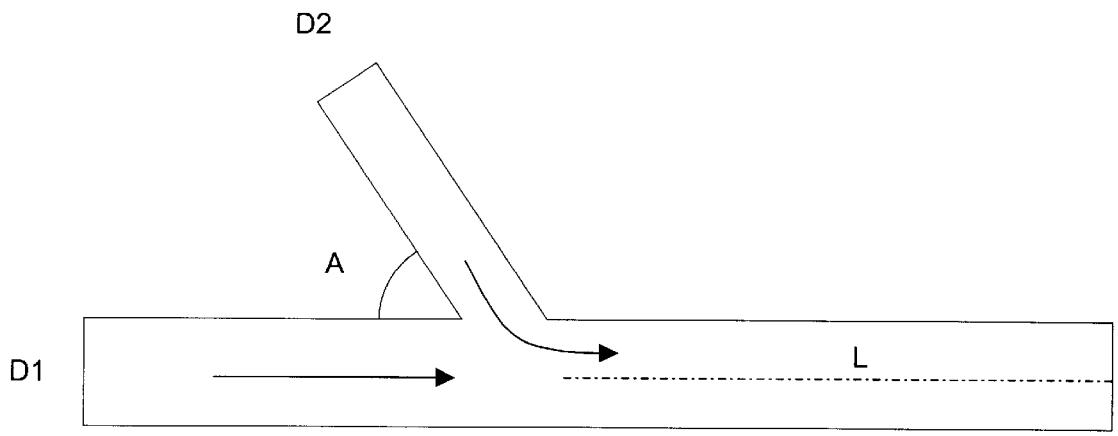
FIG. 65 is an illustration of a subject of a simulation task.
FIG. 66 is the text of a configuration file for the simulation task of FIG. 65 according to the invention.

FIG. 65 illustrates the subject of an example CCL file that follows in FIGS. 66 through 73. A T-Junction comprises a first pipe of a first diameter D1 and a second intersecting pipe of a second diameter D2. The first and second pipes intersecting at angle A and extending length L post-intersection.

Figure 74:
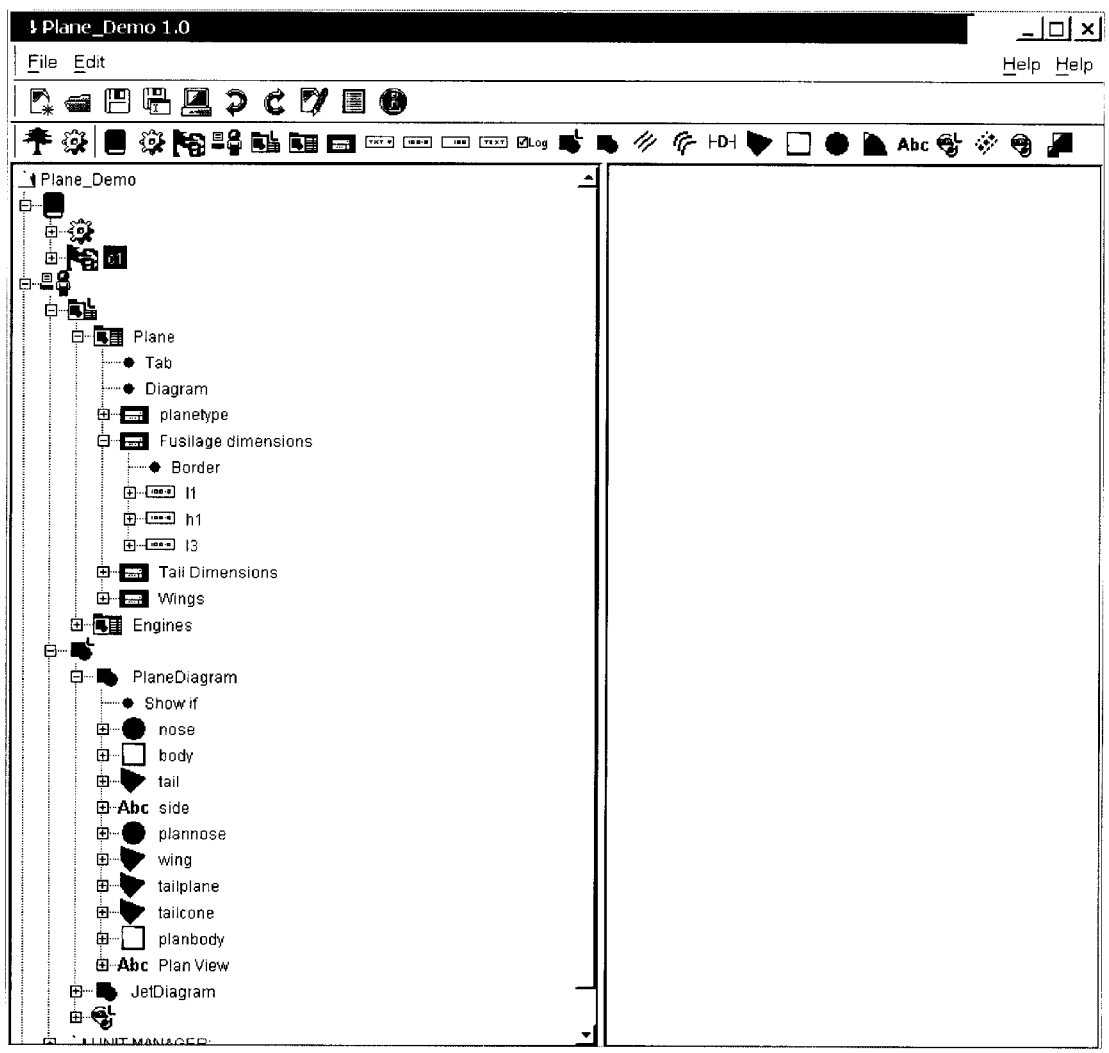
FIG. 74 is a screen shot illustration of template file authoring GUI according to the invention.
Figure 75:
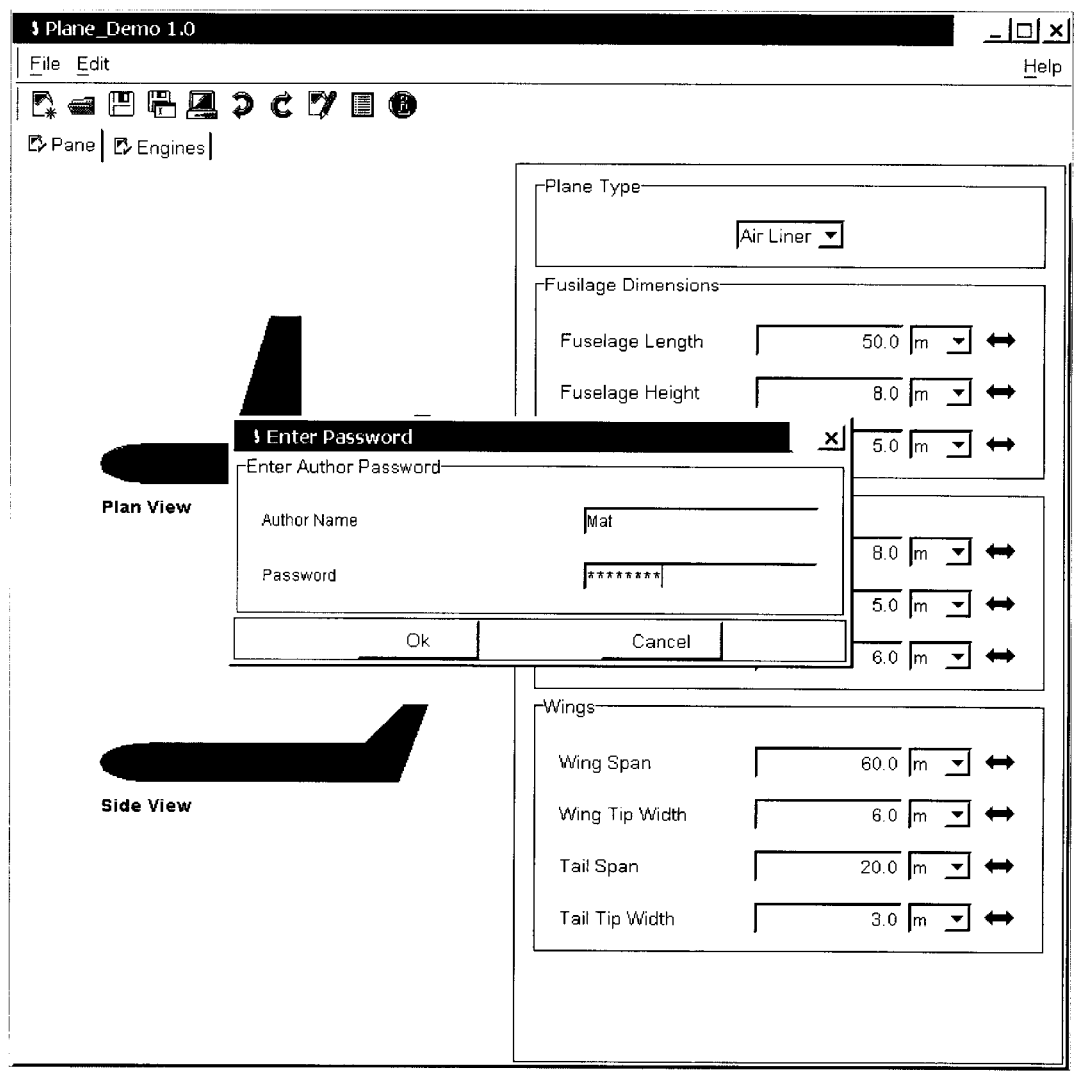
FIG. 75 is a screen shot illustration of a secure login dialog box for accessing the template file.
Figure 76:
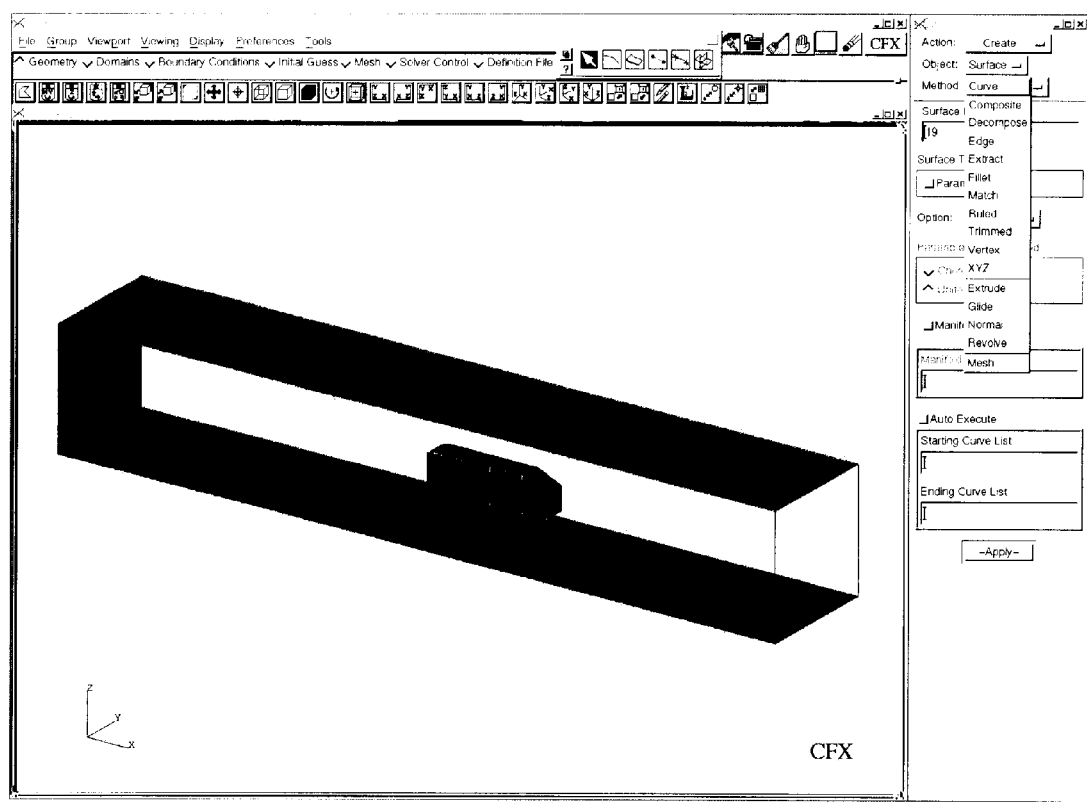
FIG. 76 is a screen shot illustration of a geometry creation process in a CFX® GUI.
Figure 77:
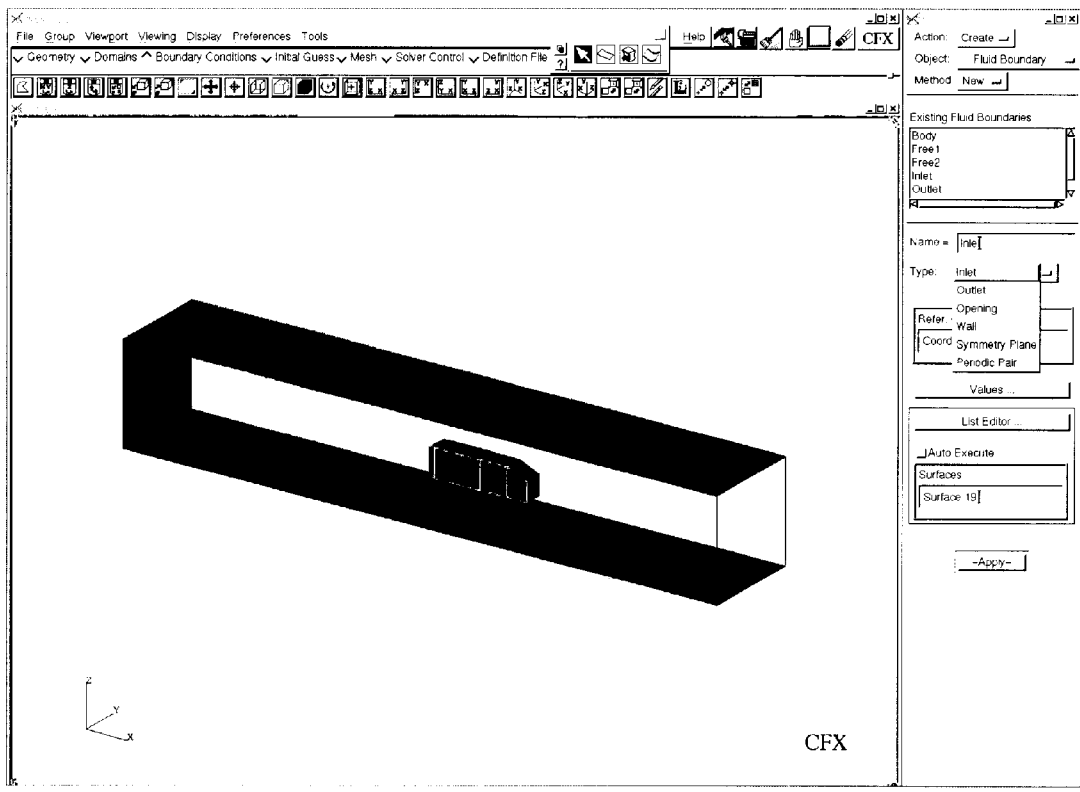
FIG. 77 is a screen shot illustration of a boundary condition definition process in a CFX® GUI.
Figure 78:
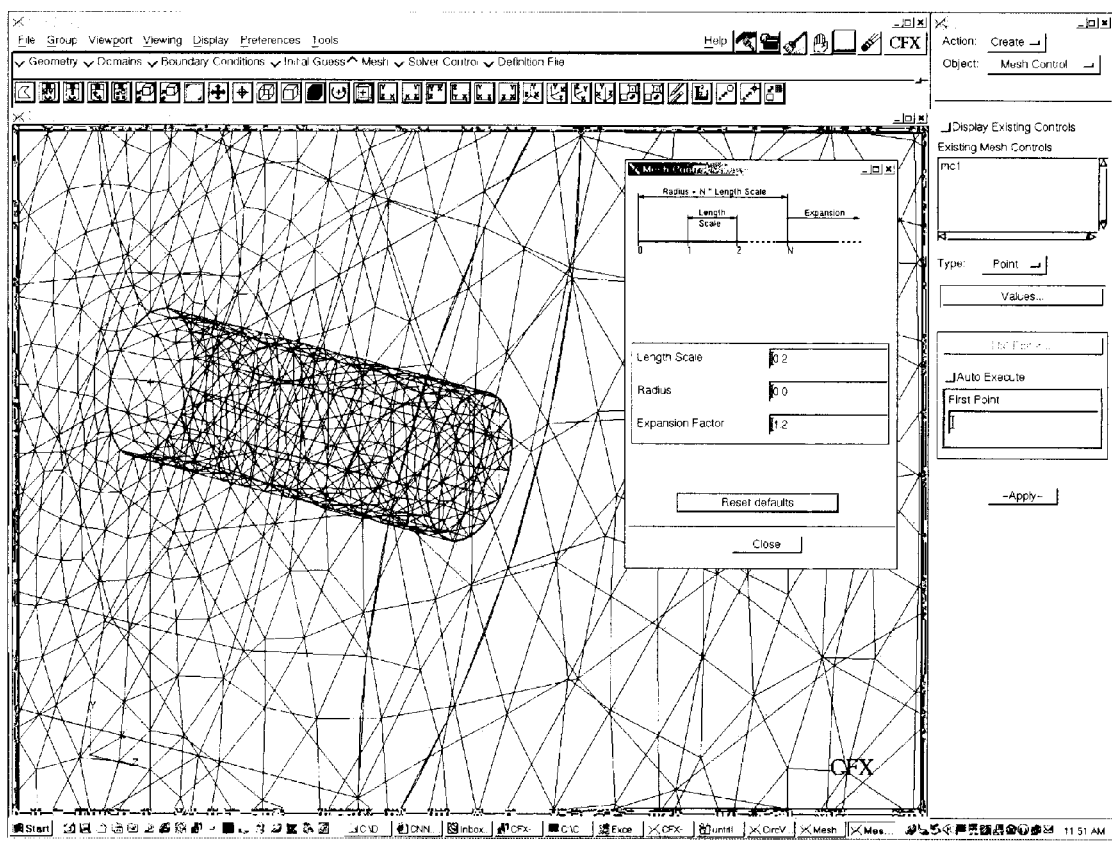
FIG. 78 is a screen shot illustration of a discretization process in a CFX® GUI.
Figure 79:
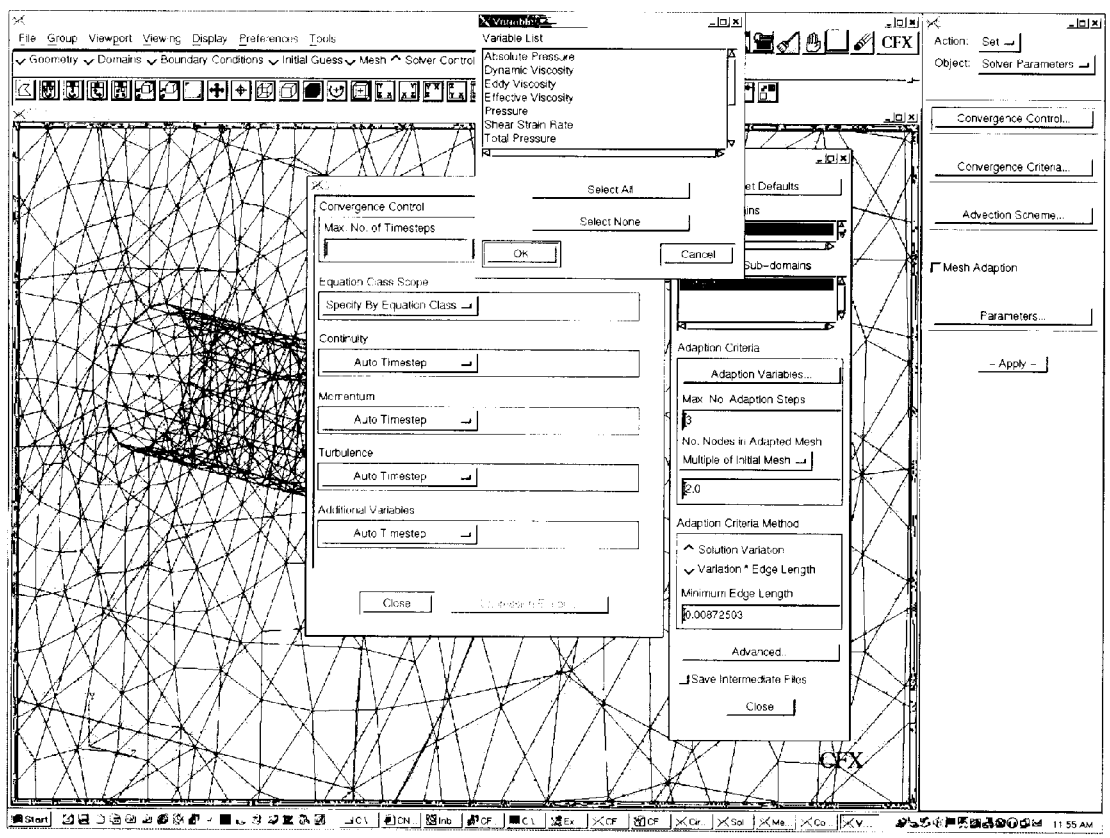
FIG. 79 is a screen shot illustration of a solver parameter definition process in a CFX® GUI.
Figure 80:
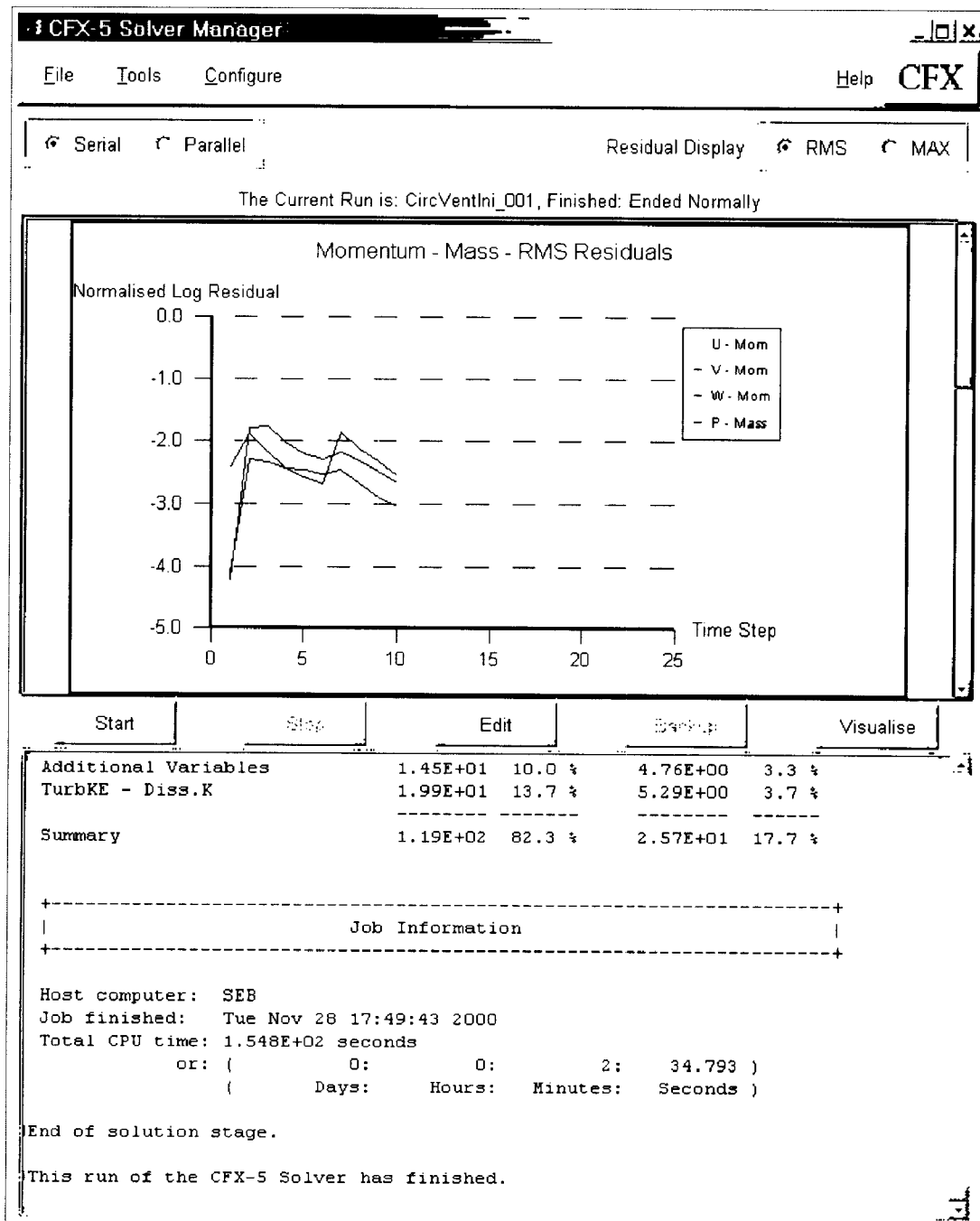
FIG. 80 is a screen shot illustration of a convergence monitoring process in a CFX® GUI.
Figure 81:
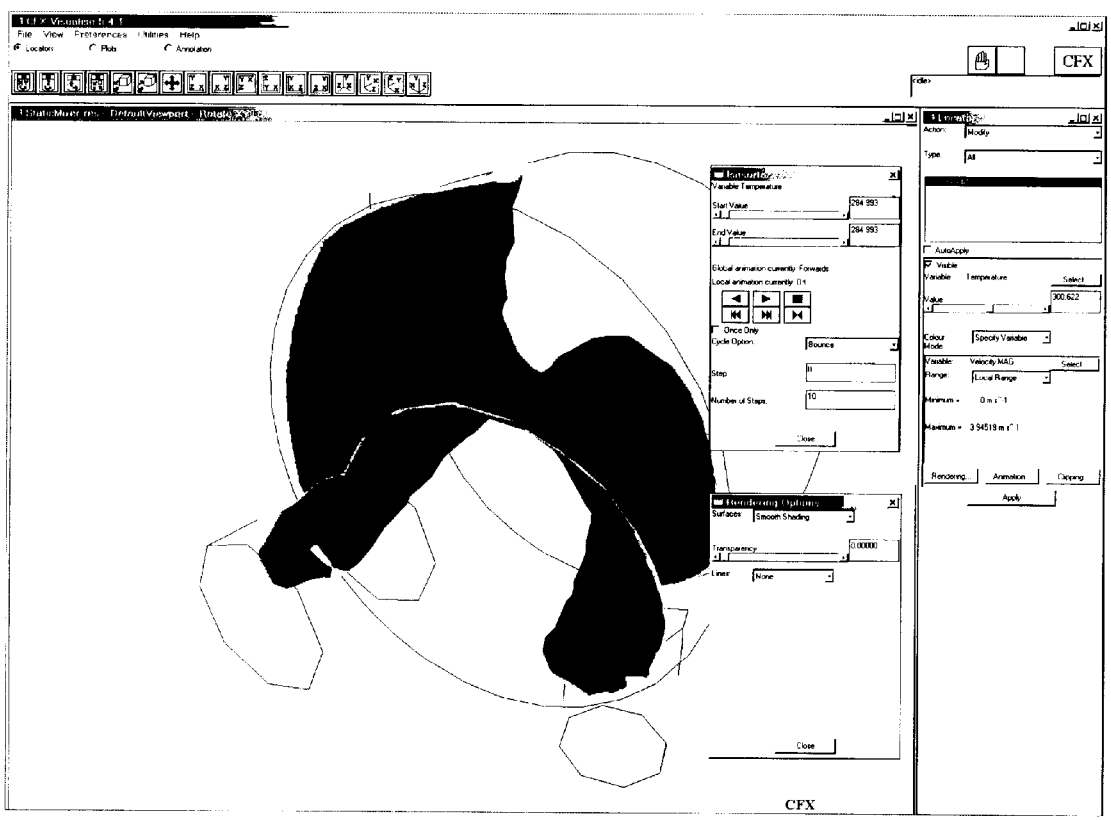
FIG. 81 is a screen shot illustration of results visualization as view via a CFX® GUI.

In FIG. 74, a GUI interface is provided for authoring template files. It can be seen that a tree structure is provided to establish a hierarchy of objects that may be added, arranged, edited or deleted as needed. The construction of a template file from this method has an important benefit wherein settings may be stored as proprietary files, not readable by standard ASCII text file viewers. This permits the author to maintain some control over the technical and creative work invested into the template. The secure authoring environment also permits libraries of templates to be more easily distributed without fear of improper modification or piracy. Another benefit of the GUI shown is that it is displayed in an object metaphor wherein settings may be encapsulated and reused as needed. For example, an object might be noted as a plane. All planes generally have fuselage dimensions, tail dimensions and wings. If another plane is needed for a template with the same characteristics, it can simply be imported as an object. Even if some settings need to be adjusted, such as the wings, the modifications may be made without revising all parameters from the ground up. In FIG. 75, it can be seen that a secure login is required prior to utilizing or modifying the template file.

FIGS. 76–81 are provided to illustrate the complexity of certain software application such as CFX® even thought they are provided with GUIs. Accordingly, it should be understood that the present invention provides a solution for complex software whether they have a command line interface, GUI, or both.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method for configuring and executing a software application with a client user interface, the method comprising the steps of:

accessing a master configuration file containing an array of configuration variables controlling the execution of the software application;

preselecting a subset of configuration variables from the array of configuration variables contained in the master configuration file;

generating the client user interface to modify only the subset of configuration variables;

transmitting the client user interface to a client computer;

receiving the subset of configuration variables as modified on the client computer;

applying the subset of configuration variables against the master configuration file;

executing the software application in accordance with the master configuration file on a computational server, the execution of the software application producing an output result;

transmitting the output result to the client computer.

2. The method of claim 1 further comprising the step of storing in the master configuration file access instructions to a plurality of computational servers available to execute the software application.

3. The method of claim 1 further comprising the step storing in the master configuration file configuration settings for displaying a plurality of languages in the client user interface.

4. The method of claim 1 further comprising the step storing in the master configuration file licensing information for managing available licenses to permit the execution of the software application.

5. The method of claim 1 further comprising the steps of:
receiving substantially concurrently a plurality of subsets;
storing the plurality of subsets prior to execution on the computational server;

executing each subset as the computational server becomes available for processing.

6. The method of claim 5 further comprising the step storing in the master configuration file queuing data for establishing a relative execution priority of the plurality of subsets.

7. The method of claim 5 further comprising the step of transmitting a processing status report to the client user interface.

8. The method of claim 1 further comprising the steps of writing the preselected subset of configuration variables to a template file wherein the form and appearance of client user interface is defined by the template file.

9. The method of claim 1 further comprising the step of preselecting a default measurement unit for at least one variable of the preselected subset of configuration variables.

10. The method of claim 1 further comprising the step of preselecting a plurality of measurement units selectable for at least one variable of the preselected subset of configuration variables.

11. The method of claim 1 further comprising the step of preselecting a default value for at least one variable of the preselected subset of configuration variables.

12. The method of claim 11 further comprising the step of establishing permissible bounds for the at least one variable of the preselected subset of configuration variables.

13. The method of claim 12 further comprising the step of establishing permissible bounds for the at least one variable relative to the value of a second variable.

14. The method of claim 1 further comprising the step of establishing a text string description for at least one variable of the preselected subset of configuration variables.

15. The method of claim 1 further comprising the step of establishing an input means for accepting a plurality of linear values for at least one variable of the preselected subset of configuration variables.

16. The method of claim 1 further comprising the step of predefining at least one graphic representation of the subset of configuration variables for display on the client user interface.

17. The method of claim 16 further comprising the step of modifying the at least one graphic representation responsive to a modification in at least one variable of the preselected subset of configuration variables.

18. The method of claim 17 further comprising the step of displaying at least one dimension value in visual proximity to the at least one graphic representation.

19. The method of claim 18 further comprising the step of making visible a first dimension value responsive to a modification of a first variable of the preselected subset of configuration variables and making the first dimension value invisible responsive to a modification of another variable of the preselected subset of configuration variables.

20. The method of claim 1 further comprising the step of displaying a plurality of images on the client user interface, at least one variable of the preselected subset of configuration variables being modified responsive to the selection of an individual image within the group of the plurality of images.

21. The method of claim 1 wherein a plurality of master configuration files may be accessed and modified.

22. The method of claim 1 wherein a plurality of software applications may be executed.

23. A method for remotely accessing at least one software application with a client user interface, the method comprising the steps of:
  accessing at least one master configuration file containing an array of configuration variables controlling the execution of the software application;
  replacing a preexisting configuration variable in the at least one master configuration file with a machine readable identifier;
  accepting a user-defined configuration variable corresponding to the preexisting configuration variable from a client computer; and
  replacing the machine readable identifier with the user-defined configuration variable.

24. The method of claim 23 wherein a plurality of user-defined configuration variables are accepted and replace a plurality of corresponding machine readable identifiers.

25. The method of claim 23 wherein the step of accepting the plurality of user-defined configuration variables from the client computer further comprises retrieving a file post containing the plurality of user-defined configuration variables.

26. The method of claim 25 wherein the step of accepting the plurality of user-defined configuration variables from the client computer further comprises retrieving a delimited string post containing the plurality of user-defined configuration variables.

27. A method for configuring and executing at least one software application with a client user interface, the method comprising the steps of:
  establishing a computational server running the at least one software application;
  establishing an application server communicatively coupled to the computational server;
  establishing a communications pathway from the application server to at least one client computer, the communications pathway adapted to transmit data for displaying a graphic user interface on the client computer;
  accessing at least one master configuration file containing an array of configuration variables controlling the execution of the software application;
  preselecting a subset of configuration variables from the array of configuration variables contained in the at least one master configuration file;
  establishing a template file wherein the subset of configuration variables and the appearance of the graphic user interface are defined by the template file;
  storing the template file on a storage medium communicatively accessible by the application server;
  transmitting the template file to the client computer;
  responsive to receiving an array of modified configuration variables from the client computer, applying the array of modified configuration variables to the at least one master configuration file;
  executing the at least one software application in accordance with the at least one master configuration file on the computational server;
  outputting a result;
  transmitting the result to the client computer.

* * * * *